United States Patent
Ogawa et al.

(10) Patent No.: US 7,402,368 B2
(45) Date of Patent: Jul. 22, 2008

(54) HYDROPHOBIC INORGANIC FINE PARTICLES, HYDROPHOBIC INORGANIC FINE PARTICLES PRODUCTION PROCESS, AND TONER

(75) Inventors: Yoshihiro Ogawa, Shizuoka-ken (JP); Takashige Kasuya, Shizuoka-ken (JP); Kaori Hiratsuka, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/681,396

(22) Filed: Mar. 2, 2007

(65) Prior Publication Data

US 2007/0148577 A1 Jun. 28, 2007

Related U.S. Application Data

(62) Division of application No. 10/853,144, filed on May 26, 2004, now Pat. No. 7,238,387.

(30) Foreign Application Priority Data

Jul. 30, 2003  (JP) .............................. 2003-203865

(51) Int. Cl.
   *G03G 9/08* (2006.01)
(52) U.S. Cl. .............. 430/108.1; 430/108.3; 430/108.7; 423/659
(58) Field of Classification Search .............. 430/108.1, 430/108.6, 108.7, 108.3; 428/32.34; 423/659
See application file for complete search history.

(56) References Cited

U.S. PATENT DOCUMENTS

| | | | | |
|---|---|---|---|---|
| 5,219,696 A | | 6/1993 | Demizu et al. ............... | 430/110 |
| 5,563,693 A | | 10/1996 | Takahata et al. ............. | 355/274 |
| 5,620,823 A | * | 4/1997 | Kambayashi et al. ........ | 430/102 |
| 5,700,616 A | | 12/1997 | Kasuya et al. ............... | 430/110 |
| 5,712,073 A | | 1/1998 | Katada et al. ................ | 430/110 |
| 5,729,811 A | | 3/1998 | Takahata et al. ............. | 399/316 |
| 5,750,302 A | | 5/1998 | Ogawa et al. ............. | 430/106.6 |
| 6,022,661 A | | 2/2000 | Kurose et al. ............. | 430/108.7 |
| 6,187,497 B1 | * | 2/2001 | Kushi et al. ................ | 430/110.4 |
| 6,197,470 B1 | | 3/2001 | Tamura .................... | 430/108.7 |
| 6,589,701 B2 | | 7/2003 | Yamazaki et al. ......... | 430/106.2 |
| 6,777,151 B2 | | 8/2004 | Hagi et al. ............... | 430/108.4 |
| 2003/0129510 A1 | * | 7/2003 | Hagi et al. .................... | 430/45 |

FOREIGN PATENT DOCUMENTS

| | | |
|---|---|---|
| EP | 0 971 273 A1 | 12/2000 |
| JP | 36-10231 | 7/1961 |
| JP | 54-80752 | 6/1979 |
| JP | 59-53856 | 3/1984 |
| JP | 59-61842 | 4/1984 |

(Continued)

*Primary Examiner*—John L Goodrow
(74) *Attorney, Agent, or Firm*—Fitzpatrick, Cella, Harper & Scinto

(57) ABSTRACT

Hydrophobic inorganic fine particles characterized by being a mixture of at least small-particle-diameter inorganic fine particles having an average primary particle diameter of 5 to 25 nm and having a maximum peak particle diameter of 20 nm or less and large-particle-diameter inorganic fine particles having an average primary particle diameter which is 1.5 to 100 times the average primary particle diameter of the small-particle-diameter inorganic fine particles; the mixture being a mixture having been treated in the same treating tank to subject both the small-particle-diameter inorganic fine particles and large-particle-diameter inorganic fine particles simultaneously to hydrophobic treatment.

19 Claims, 2 Drawing Sheets

FOREIGN PATENT DOCUMENTS

| | | |
|---|---|---|
| JP | 04-204751 | 7/1992 |
| JP | 05-346682 | 12/1993 |
| JP | 06-313980 | 11/1994 |
| JP | 06-332235 | 12/1994 |
| JP | 07-002724 | 4/1995 |
| JP | 07-092724 | 4/1995 |
| JP | 07-104501 | 4/1995 |
| JP | 08-36316 | 2/1996 |
| JP | 00-056595 | 2/2000 |
| JP | 002-23414 | 1/2002 |

* cited by examiner

HYDROPHOBIC INORGANIC FINE PARTICLES, HYDROPHOBIC INORGANIC FINE PARTICLES PRODUCTION PROCESS, AND TONER

BACKGROUND OF THE INVENTION

1. Field of the Invention

This invention relates to hydrophobic inorganic fine particles used in image forming processes such as electrophotography, electrostatic printing and toner jetting, a process for producing the hydrophobic inorganic fine particles, and a toner containing the hydrophobic inorganic fine particles.

2. Related Background Art

It is commonly known to add small-particle-diameter inorganic fine particles to toner particles for the purpose of controlling toner characteristics such as chargeability and fluidity of toners to achieve good developing performance.

In toners to which such small-particle-diameter inorganic fine particles are added, it has been ascertained that the small-particle-diameter inorganic fine particles come to stand buried in surface portions of toner particles because of a stress applied between a toner and a carrier when the toner is used as a two-component developer, a stress applied from a developing blade and a developing sleeve when the toner is used as a one-component developer, an impact against inner walls of a developing assembly and a toner agitation blade, and a mutual impact between toner particles.

In order to make the small-particle-diameter inorganic fine particles less buried, it is effective to use large-particle-diameter inorganic fine particles in combination, as disclosed in Japanese Patent Applications Laid-Open No. H04-204751, No. H05-346682, No. H06-313980, No. H06-332235 and No. H07-92724.

The large-particle-diameter inorganic fine particles have an effect as a spacer, and hence they prevent toner particle surfaces to which the small-particle-diameter inorganic fine particles have adhered, from coming into direct contact with the carrier, developing blade, developing sleeve, developing assembly inner walls, toner agitation member and other toner to lessen the stresses. This makes the small-particle-diameter inorganic fine particles kept from being buried in the surface portions of toner particle, and brings achievement of longer lifetime of toners.

Japanese Patent Application Laid-Open No. H04-204751 discloses a toner having hydrophobic fine silica particles and hydrophobic fine titanium oxide particles or hydrophobic fine aluminum oxide particles, which is a toner characterized in that the hydrophobic fine titanium oxide particles or the hydrophobic fine aluminum oxide particles have peaks at 10 to 20 µm and 30 to 60 µm in primary particle diameter.

Japanese Patent Application Laid-open No. H05-346682 discloses a toner characterized in that an inorganic fine powder having a BET specific surface area of less than 80 $m^2/g$ and treated with a silicone oil and an inorganic fine powder having a BET specific surface area of 80 $m^2/g$ or more and treated with a silane coupling agent.

Japanese Patent Application Laid-open No. H06-332235 discloses a toner for electrophotography comprising toner particles and at least two types of external additives, which is a toner for electrophotography which is characterized in that particles of 5 µm or smaller are present in a proportion of 1 to 8% by volume in particle size distribution of toner particles, that a first external additive has an average particle diameter of 0.1 to 0.5 µm in number base of primary particles, and that a second external additive has an average particle diameter of 20 nm or less in number base of primary particles and is hydrophobic.

Japanese Patent Application Laid-Open No. H07-104501 discloses a proposal of a toner making use of hydrophobic fine silica particles of 15 to 20 nm in particle diameter and hydrophobic fine silica particles or alumina fine particles of 13 nm or less in particle diameter.

However, because of the addition of two types of hydrophobic inorganic fine particles different in particle diameter, these toners have had problems in respect of mixability of the both and dispersion on the surfaces of toner particles, and had insufficient development durability and charging stability.

Japanese Patent Application Laid-Open No. H06-313980 discloses a developer characterized in that inorganic fine particles have, in its number primary particle diameter distribution curve, i) a maximum value of number proportion at each of a primary particle diameter x (nm) (where $20 \leq x \leq 50$) and a primary particle diameter y (nm) (where $3x \leq y \leq 6x$) and ii) 10% by number or less of number proportion in the primary particle diameter (x+y)/2 (nm), have a value of X/Y within the range of from 0.5 to 2.0 where the number proportion of inorganic fine particles on the side of small particle diameter which have a primary particle diameter of less than (x+y)/2 (nm) is represented by X % by number and the number proportion of inorganic fine particles on the side of large particle diameter which have a primary particle diameter of (x+y)/2 (nm) or more by Y % by number, and have a value of z/x of from 150 to 400 where the volume-average particle diameter of toner particles is represented by z (nm).

However, in this inorganic fine particles, the peak of the primary particle diameter on the side of small particle diameter in the number primary particle diameter distribution is as relatively large as 20 nm or more, and moreover a peak is also present on the side of large particle diameter. Hence, when calculated on the basis of weight, it follows that the large-particle-diameter inorganic fine particles are present in a very large number in respect to the small-particle-diameter inorganic fine particles, bringing about problems on fluidity and chargeability.

Japanese Patent Applications Laid-Open No. H08-36316, No. 2000-56595 and No. 2002-23414 disclose, in a contact transfer assembly in which a bias is applied to a transfer member by a means for applying the bias and a toner held on a latent image bearing member, prepared by externally adding to and mixing in toner particles at least two types of external additives different in average particle diameter, is transferred to a transfer medium, a contact transfer assembly which has defined the relationship between the loose apparent density of the toner and the hardness of the transfer member. However, the respective two types of external additives different in average particle diameter, used here, have separately been hydrophobic-treated, and hence the both differ in their agglomerative properties and readiness of dispersion on toner particle surfaces, and it has been difficult to disperse the both uniformly on the surfaces of toner particles.

Under such a technical background, it is earnestly sought to newly provide novel hydrophobic inorganic fine particles such that the small-particle-diameter inorganic fine particles and the large-particle-diameter inorganic fine particles can readily and uniformly be dispersed on the toner particle surfaces even where they have been hydrophobic-treated.

SUMMARY OF THE INVENTION

An object of the present invention is to provide hydrophobic inorganic fine particles which can impart superior fluidity, chargeability and durability (running performance) to the toner.

Another object of the present invention is to provide a toner which has superior fluidity, developing performance and chargeability, may cause less fog, and can not easily deteriorate as having superior running performance.

Still another object of the present invention is to provide a process for producing the hydrophobic inorganic fine particles which can impart superior fluidity, chargeability and running performance to the toner.

That is, to achieve the above objects, the present invention provides hydrophobic inorganic fine particles comprising a mixture obtained by mixing at least two types of hydrophobic inorganic fine particles, small-particle-diameter inorganic fine particles having an average primary particle diameter of from 5 nm to 25 nm in number-based particle size distribution and having a maximum peak particle diameter of 20 nm or less in number-based particle size distribution and large-particle-diameter inorganic fine particles having an average primary particle diameter in number-based particle size distribution which is from 1.5 to 100 times the average primary particle diameter of the small-particle-diameter inorganic fine particles in number-based particle size distribution;

the mixture being a mixture having been treated in the same treating tank to subject both the small-particle-diameter inorganic fine particles and the large-particle-diameter inorganic fine particles simultaneously to hydrophobic treatment.

The present invention also provides a process for producing hydrophobic inorganic fine particles; the process having:

a mixing step of mixing at least small-particle-diameter inorganic fine particles and large-particle-diameter inorganic fine particles to obtain a mixture; and a hydrophobic treatment step of treating the mixture in the same treating tank to subject both the small-particle-diameter inorganic fine particles and the large-particle-diameter inorganic fine particles simultaneously to hydrophobic treatment, wherein the small-particle-diameter inorganic fine particles have an average primary particle diameter of from 5 nm to 25 nm in number-based particle size distribution and have a maximum peak particle diameter of 20 nm or less in number-based particle size distribution, and the large-particle-diameter inorganic fine particles have an average primary particle diameter in number-based particle size distribution which is from 1.5 to 100 times the average primary particle diameter of the small-particle-diameter inorganic fine particles in number-based particle size distribution.

The present invention also provides a toner having at least:

toner particles having at least a binder resin and a colorant; and hydrophobic inorganic fine particles comprising a mixture obtained by mixing at least two types of hydrophobic inorganic fine particles, small-particle-diameter inorganic fine particles having an average primary particle diameter of from 5 nm to 25 nm in number-based particle size distribution and having a maximum peak particle diameter of 20 nm or less in number-based particle size distribution and large-particle-diameter inorganic fine particles having an average primary particle diameter in number-based particle size distribution which is from 1.5 to 100 times the average primary particle diameter of the small-particle-diameter inorganic fine particles in number-based particle size distribution;

the mixture being a mixture having been treated in the same treating tank to subject both the small-particle-diameter inorganic fine particles and the large-particle-diameter inorganic fine particles simultaneously to hydrophobic treatment.

DESCRIPTION OF THE PREFERRED EMBODIMENTS

Figure 1:
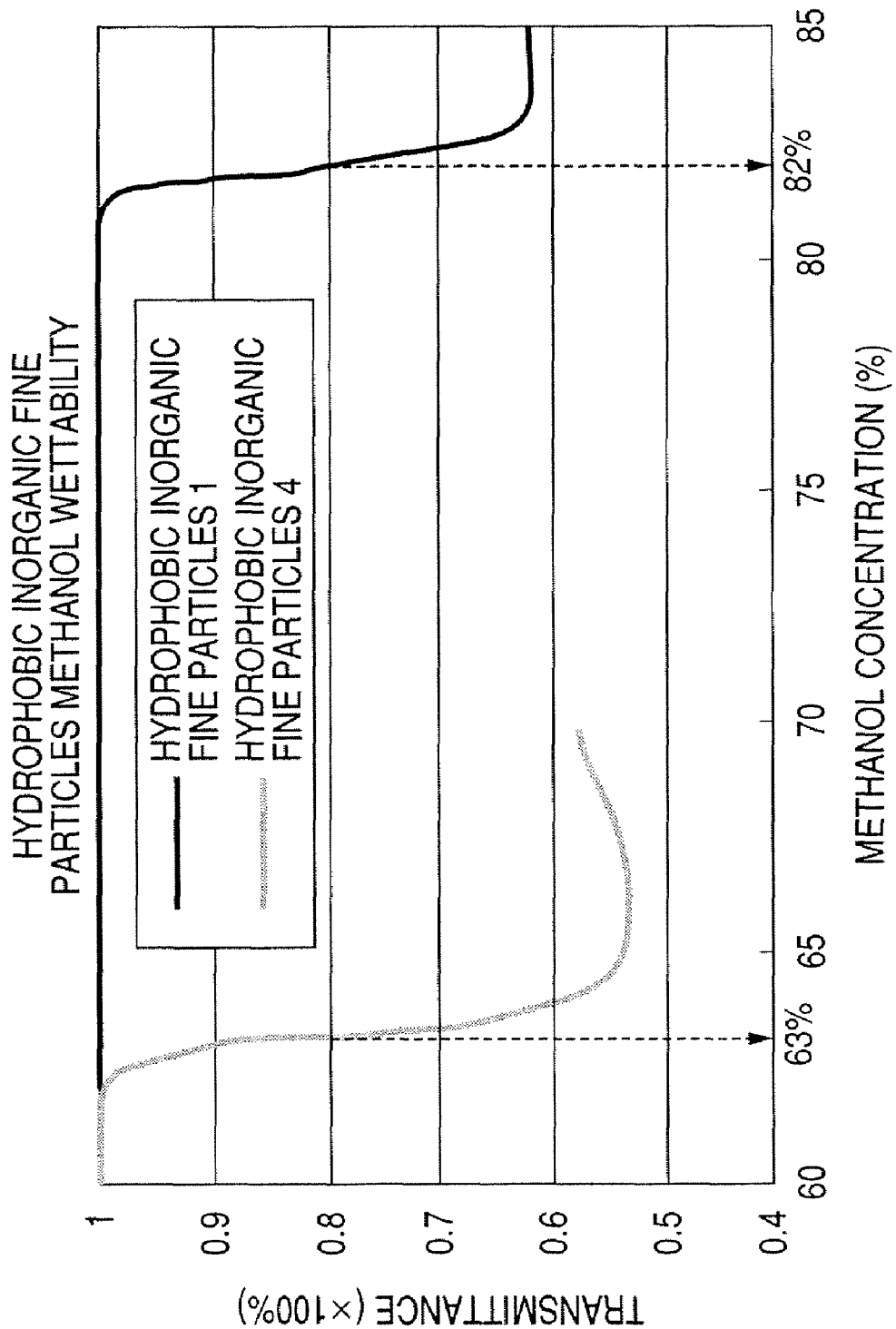
FIG. 1 is a graph showing the results of measurement of methanol wettability of the hydrophobic inorganic fine particles of the present invention.

In the present invention, both the small-particle-diameter inorganic fine particles and the large-particle-diameter inorganic fine particles are present as primary particles on the toner particle surfaces. This enables the toner to be provided with superior fluidity and chargeability by their addition in a small quantity and without making fixing performance poor, and also enables the toner to be prevented from deterioration.

The present inventors have made extensive studies on hydrophobic inorganic fine particles to be externally added to toner particles. As a result, they have discovered that the use of hydrophobic inorganic fine particles obtained by treating a mixture of small-particle-diameter inorganic fine particles and large-particle-diameter inorganic fine particles in the same treating tank to subject both the small-particle-diameter inorganic fine particles and large-particle-diameter inorganic fine particles simultaneously to hydrophobic treatment makes it possible to make the small-particle-diameter inorganic fine particles and large-particle-diameter inorganic fine particles uniformly disperse on and adhere to the surfaces of toner particles, and can provide a toner which have superior running performance and can not easily deteriorate.

The small-particle-diameter inorganic fine particles are chiefly added in order to provide the toner with chargeability and fluidity. The large-particle-diameter inorganic fine particles are present as spacer particles on the surfaces of toner particles, and thus have been added in order to afford the function to reduce the load that is applied to the small-particle-diameter inorganic fine particles when the toner and the agitation member, the toner and the developing sleeve, the toner and the developing blade, the toner and the developing assembly inner walls, and the toner and the toner (toner particles themselves) come into contact with each other, to prevent the toner from deteriorating because the small-particle-diameter inorganic fine particles come buried in toner particle surface portions or come off the surfaces of toner particles.

The hydrophobic inorganic fine particles added to the toner particles can most effectively exhibit the function to provide the toner with fluidity and chargeability and prevent it from deterioration, in a case in which both the small-particle-diameter inorganic fine particles and the large-particle-diameter inorganic fine particles are present not as agglomerates but as primary particles on the surfaces of toner particles.

If the small-particle-diameter inorganic fine particles are present on the surfaces of toner particles in the state they have agglomerated, such particles make it difficult for the toner to be provided with superior fluidity and chargeability and, in addition thereto, have to be added in a larger quantity because the number of particles may become small which function effectively to provide the toner with fluidity and chargeability. Also, such addition in a larger quantity may make the surfaces of toner particles covered with the inorganic fine particles to make the toner have a poor fixing performance.

If the large-particle-diameter inorganic fine particles are present in the state they have agglomerated, such particles have a weak adherence to the toner particles to tend to come to stand liberated from the toner particles, so that they may come to behave differently from the toner particles to function weakly as the spacer particles, making it difficult to obtain the effect of preventing deterioration. Also, the agglomerates of the inorganic fine particles may come loose because of a mechanical load applied to the toner, and hence it is very difficult to control the state of agglomeration, making it difficult to attain a stable toner performance over a long period of time. Moreover, the presence of the agglomerates of the large-particle-diameter inorganic fine particles makes the distance between toner particles themselves too large, also tending to make the toner have a poor fixing performance.

That is, the presence of both the small-particle-diameter inorganic fine particles and the large-particle-diameter inorganic fine particles as primary particles on the surfaces of toner particles enables the toner to be provided with superior fluidity and chargeability by their addition in a small quantity and without making fixing performance poor.

It is conventionally prevalent that two or more types of hydrophobic inorganic fine particles different in particle diameter are added to toner particles. Hitherto, it has been attempted to obtain the desired toners by subjecting each of two or more types of inorganic fine particles separately to hydrophobic treatment, and adding to and mixing in the toner particles the two or more types of hydrophobic inorganic fine particles. The inorganic fine particles thus subjected to hydrophobic treatment tend to cause mutual adhesion of particles themselves to tend to agglomerate, because a hydrophobic treatment agent such as a coupling agent or an oil is present on the surfaces of inorganic fine particles. Also, the inorganic fine particles differ in agglomerative properties when they differ in particle diameter and hydrophobicity, and hence it has been very difficult to make a plurality of types of hydrophobic inorganic fine particles uniformly disperse on and adhere to the surfaces of toner particles in the state of primary particles. Moreover, in an attempt to make them disperse on and adhere to the surfaces of toner particles in the state of primary particles, it is necessary that the procedure of their addition to and mixing in toner particles is divided into two steps or three steps, e.g., those having high agglomerative properties are first added to and mixed in toner particles and then those having low agglomerative properties are again added to and mixed in toner particles. This makes it necessary to adjust optimum conditions such as mixing strength and mixing time for each step, bringing about a problem that the productivity lowers.

In the hydrophobic inorganic fine particles of the present invention, the mixture of small-particle-diameter inorganic fine particles and large-particle-diameter inorganic fine particles is treated in the same treating tank to subject both the small-particle-diameter inorganic fine particles and large-particle-diameter inorganic fine particles simultaneously to hydrophobic treatment. Hence, the small-particle-diameter inorganic fine particles and large-particle-diameter inorganic fine particles both having been made hydrophobic stand mixed uniformly on the level of primary particles. Also, the hydrophobic treatment of the small-particle-diameter inorganic fine particles and that of the large-particle-diameter inorganic fine particles are simultaneously carried out in the same treating tank. Hence, the surface properties and agglomerative properties of the small-particle-diameter inorganic fine particles and large-particle-diameter inorganic fine particles come into a very close state, so that, also when added to and mixed in the toner particles, they can be made to disperse uniformly on the surfaces of toner particles in the state of primary particles, making it possible to sufficiently bring out the effect the small-particle-diameter inorganic fine particles and the large-particle-diameter inorganic fine particles each have. Also, the small-particle-diameter inorganic fine particles and the large-particle-diameter inorganic fine particles are treated under the same conditions. Hence, the state of treatment for individual particles comes uniform, and the charging of the toner can be made stable with great ease, so that, e.g., the charging may less vary depending on environment and any fog in low-humidity environment can be remedied. Furthermore, they can be made to disperse uniformly on the surfaces of toner particles, and the inorganic fine particles may be added in a small quantity. Hence, the fixing performance also can not easily come poor.

It has been found difficult to achieve this effect, for those in which the small-particle-diameter inorganic fine particles and the large-particle-diameter inorganic fine particles have separately been subjected to hydrophobic treatment, even if the type, treatment level and treatment conditions of the hydrophobic treatment are adjusted.

In the hydrophobic inorganic fine particles of the present invention, it is necessary to mix at least two types of inorganic fine particles, i.e., small-particle-diameter inorganic fine particles having an average primary particle diameter of from 5 nm to 25 nm in number-based particle size distribution and having a maximum peak particle diameter of 20 nm or less in number-based particle size distribution and large-particle-diameter inorganic fine particles having an average primary particle diameter in number-based particle size distribution which is from 1.5 to 100 times the average primary particle diameter the small-particle-diameter inorganic fine particles have in number-based particle size distribution.

Where the small-particle-diameter inorganic fine particles have the average primary particle diameter of from 5 nm to 25 nm, preferably from 5 nm to 20 nm, and more preferably from 10 nm to 20 nm, in number-based particle size distribution, they can make the toner have the highest chargeability and fluidity. If the small-particle-diameter inorganic fine particles have an average primary particle diameter of less than 5 nm in number-based particle size distribution, the small-particle-diameter inorganic fine particles may adhere to one another in so large force as to tend to agglomerate when made hydrophobic, and hence it comes difficult for them to be made to disperse uniformly on the surfaces of toner particles. If the small-particle-diameter inorganic fine particles have an average primary particle diameter of more than 25 nm in number-based particle size distribution, the toner may have low fluidity and chargeability to have a poor developing performance or cause fog greatly.

The effect brought by the use of the large-particle-diameter inorganic fine particles in combination is also obtainable with greatest ease when the small-particle-diameter inorganic fine particles have a maximum peak particle diameter of 20 nm or less, and preferably 15 nm or less, in number-based particle size distribution. If the small-particle-diameter inorganic fine particles have a maximum peak particle diameter of more than 20 nm, the small-particle-diameter inorganic fine particles tend to have a broad particle size distribution to tend to make the toner have low chargeability and fluidity.

It is also an important factor in the present invention that the large-particle-diameter inorganic fine particles have an average primary particle diameter in number-based particle size distribution which is from 1.5 to 100 times, preferably 1.5 to 30 times, more preferably 1.5 to 10 times, and still more preferably 1.5 to 5 times, the average primary particle diameter the small-particle-diameter inorganic fine particles have in number-based particle size distribution.

The large-particle-diameter inorganic fine particles may most readily exhibit the effect as a spacer when the difference in particle diameter between the small-particle-diameter inorganic fine particles and the large-particle-diameter inorganic fine particles is within the above range.

If the large-particle-diameter inorganic fine particles have an average primary particle diameter in number-based particle size distribution which is less than 1.5 times the average primary particle diameter the small-particle-diameter inorganic fine particles have in number-based particle size distribution, the difference in particle diameter is so small as to make it difficult for the large-particle-diameter inorganic fine particles to have the effect as a spacer. If the difference in particle diameter is larger than 100 times, the difference in physical properties such as fluidity and bulk specific gravity between the small-particle-diameter inorganic fine particles and the large-particle-diameter inorganic fine particles is so large as to make it difficult for the both to be uniformly mixed at the time of hydrophobic treatment, so that the large-particle-diameter inorganic fine particles may segregate to make it unable to obtain uniform hydrophobic inorganic fine particles, and the toner may have a poor developing performance or cause fog greatly.

The hydrophobic inorganic fine particles of the present invention may preferably be a mixture obtained by mixing the small-particle-diameter inorganic fine particles and the large-particle-diameter inorganic fine particles in a weight ratio (weight of small-particle-diameter inorganic fine particles: weight of large-particle-diameter inorganic fine particles) of from 1:5 to 50:1, more preferably from 1:1 to 30:1, and still more preferably from 3:1 to 20:1. If the small-particle-diameter inorganic fine particles and the large-particle-diameter inorganic fine particles are in a weight ratio of less than 1:5, the small-particle-diameter inorganic fine particles is in so small content as to make the toner have poor chargeability and fluidity. If the large-particle-diameter inorganic fine particles are fewer than 50:1, the large-particle-diameter inorganic fine particles may have a small effect as a spacer to make the toner tend to deteriorate.

In the hydrophobic inorganic fine particles of the present invention, the small-particle-diameter inorganic fine particles may preferably have a BET specific surface area of from 100 m$^2$/g or more to 500 m$^2$/g or less, more preferably from 100 m$^2$/g or more to 400 m$^2$/g or less, and still more preferably from 150 m$^2$/g or more to 350 m$^2$/g or less, before hydrophobic treatment. Also, in the hydrophobic inorganic fine particles of the present invention, the large-particle-diameter inorganic fine particles may preferably have a BET specific surface area of from 5 m$^2$/g or more to less than 100 m$^2$/g, more preferably from 20 m$^2$/g or more to less than 100 m$^2$/g, and still more preferably from 30 m$^2$/g or more to less than 80 m$^2$/g, before hydrophobic treatment.

If the small-particle-diameter inorganic fine particles have a BET specific surface area of less than 100 m$^2$/g, the inorganic fine particles tend to have a broad particle size distribution to make small the function to improve chargeability and fluidity of the toner, tending to cause density decrease and fog greatly as a result of running. If the small-particle-diameter inorganic fine particles have a BET specific surface area of more than 500 m$^2$/g, it may be difficult to effect uniform hydrophobic treatment or enhance hydrophobicity (hydrophobic properties), tending to produce a difference in hydrophobicity between the small-particle-diameter inorganic fine particles and the large-particle-diameter inorganic fine particles. As the result, the developing performance may become poor especially in a high-temperature and high-humidity environment.

If the large-particle-diameter inorganic fine particles have a BET specific surface area of less than 5 m$^2$/g, they may adhere to the surfaces of toner particles in so weak force that the large-particle-diameter inorganic fine particles tend to come liberated from toner particles, and hence they may have a small effect of preventing the toner from deterioration. If the large-particle-diameter inorganic fine particles have a BET specific surface area of more than 100 m$^2$ μg, the inorganic fine particles having the particle diameter presenting an effect in the prevention of deterioration are in so small a number as to make it difficult to obtain the effect of preventing deterioration. It also comes necessary to add them in a large number in order to obtain the effect, tending to make the toner have a poor fixing performance.

Inorganic fine particles serving as a base material which are used in the present invention may include fine particles of oxides such as wet-process silica, dry-process silica, titanium oxide, alumina, zinc oxide and tin oxide; double oxides such as titanium strontium, barium titanate, calcium titanate, strontium zirconate and calcium zirconate; and carbonate compounds such as calcium carbonate and magnesium carbonate. In order to improve developing performance and fluidity, they may preferably be selected from silica, titanium oxide, alumina, and double oxides of any of these. The small-particle-diameter inorganic fine particles and the large-particle-diameter inorganic fine particles may also preferably have the same composition. This is preferable in that the both are uniformly mixed at the time of hydrophobic treatment.

What is particularly preferred is fine powder produced by vapor phase oxidation of a silicon halide, which is called dry-process silica or fumed silica. For example, it utilizes heat decomposition oxidation reaction in oxyhydrogen frame of silicon tetrachloride gas. The reaction basically proceeds as follows.

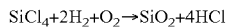

$$SiCl_4+2H_2+O_2 \rightarrow SiO_2+4HCl$$

In this production step, it is also possible to use other metal halide such as aluminum chloride or titanium chloride together with the silicon halide to obtain a composite fine powder of silica with other metal oxide, and the silica used in this invention includes these as well.

In the present invention, the small-particle-diameter inorganic fine particles and the large-particle-diameter inorganic fine particles may preferably be silica, and more preferably be the dry-process silica. This is preferable especially from the viewpoint of the readiness to mix them uniformly to carry out hydrophobic treatment and also the readiness to provide the toner with chargeability and fluidity.

The inorganic fine particles used in the present invention may be used in either of negative toners and positive toners, and are required for them to have been subjected to hydrophobic treatment with one or more types of treating agents such as a silicone varnish, a silicone oil, various modified silicone oils, a silane coupling agent, a silane coupling agent having a functional group, and besides an organosilicon compound and an organotitanium compound, which are capable of reacting with or physically adsorptive on the inorganic fine particles.

In particular, those having been treated with a silane compound or a silicone oil are preferred, of which those having been treated with the both are particularly preferred. That is, the surface treatment with such two types of treating agents enables the particles to have hydrophobicity distribution having been made uniform to high hydrophobicity, and also to be treated homogeneously to afford superior fluidity, uniform chargeability, and moisture resistance, so that toner can be provided with good developing performance, in particular, developing performance in an environment of high humidity, and running stability.

The silane compound may include alkoxysilanes such as methoxysilane, ethoxysilane and propoxysilane, halosilanes such as chlorosilane, bromosilane and iodosilane, silazanes, hydrosilanes, alkylsilanes, arylsilanes, vinylsilanes, acrylsilanes, epoxysilanes, silyl compounds, siloxanes, silylureas, silylacetamides, and silane compounds having together a different kind of substituent any of these silane compounds have. The use of any of these silane compounds can achieve fluidity, transfer performance and charge stabilization. Any of these silane compounds may be used in plurality.

As specific examples thereof, the silane compound may include hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilyl mercaptan, trimethylsilyl mercaptan, triorganosilyl acrylate, vinyldimethylacetoxysilane, dimethylethoxysilane, dimethyldimethoxysilane, diphenyldiethoxysilane, hexamethyldisiloxane, 1,3-divinyltetramethyldisiloxane, 1,3-diphenyltetramethyldisiloxane, and a dimethylpolysiloxane having 2 to 12 siloxane units per molecule and containing a hydroxyl group bonded to each Si in its units positioned at the terminals. Any of these may be used alone or in the form of a mixture of two or more types.

The silicone oil used preferably in the present invention may include reactive silicone oils such as amino-modified silicone oil, epoxy-modified silicone oil, carboxyl-modified silicone oil, carbinol-modified silicone oil, methacryl-modified silicone oil, mercapto-modified silicone oil, phenol-modified silicone oil and heterofunctional group-modified silicone oil; non-reactive silicone oils such as polyether-modified silicone oil, methyl styryl-modified silicone oil, alkyl-modified silicone oil, fatty acid-modified silicone oil, alkoxyl-modified silicone oil and fluorine-modified silicone oil; and straight silicone oils such as dimethylsilicone oil, methylphenylsilicone oil, diphenylsilicone oil and methylhydrogensilicone oil.

Of these silicone oils, preferred is a silicone oil having as a substituent an alkyl group, an aryl group, an alkyl group part or the whole of hydrogen atoms of which is/are substituted with a fluorine atom or atoms, or a hydrogen atom. Stated specifically, it includes dimethylsilicone oil, methylphenylsilicone oil, methylhydrogensilicone oil and fluorine-modified silicone oil.

These silicone oils may preferably have a viscosity at 25° C. of from 5 to 2,000 mm²/s, more preferably from 10 to 1,000 mm²/s, and still more preferably from 30 to 100 mm²/s. If it is less than 5 mm²/S, no sufficient hydrophobicity can be obtained in some cases. If it exceeds 2,000 mm²/s, it may become difficult to make uniform treatment when the inorganic fine particles are treated, or agglomerates tend to be produced and no sufficient fluidity can be obtained in some cases.

Those having been treated with a silane compound N containing nitrogen may also be used as the hydrophobic inorganic fine particles of the present invention, which are preferred especially when used in positive toners. As examples of such a treating agent, it may include aminopropyltrimethoxysilane, aminopropyltriethoxysilane, dimethylaminopropyltrimethoxysilane, diethylaminopropyltrimethoxysilane, dipropylaminopropyltrimethoxysilane, dibutylaminopropyltrimethoxysilane, monobutylaminopropyltrimethoxysilane, dioctylaminopropyltrimethoxysilane, dibutylaminopropyldimethoxysilane, dibutylaminopropylmonomethoxysilane, dimethylaminophenyltriethoxysilane, trimethoxysilyl-γ-propylphenylamine, trimethoxysilyl-γ-propylbenzylamine, trimethoxysilyl-γ-propylpiperidine, trimethoxysilyl-γ-propylmorpholine, and trimethoxysilyl-γ-propylimidazole. Any of these treating agents may be used alone or in the form of a mixture of two or more types, or after their multiple treatment.

As still other organic treatment, the inorganic fine particles may also be treated with a silicone oil N having a nitrogen atom in the side chain. This is preferred especially when used in positive toners. Such a silicone oil includes a silicone oil having at least a unit(s) represented by the following formula(s) (3) and/or (4).

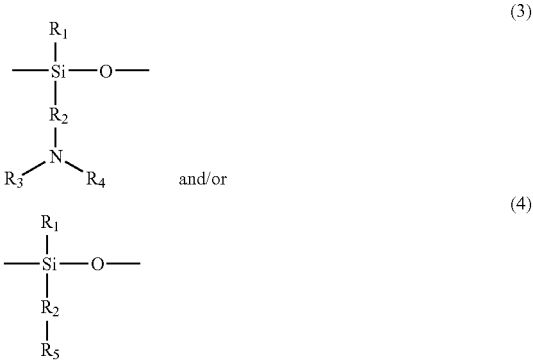

wherein $R_1$ represents a hydrogen atom, an alkyl group, an aryl group or an alkoxyl group; $R_2$ represents an alkylene group or a phenylene group; $R_3$ and $R_4$ each represents a hydrogen atom, an alkyl group or an aryl group; and $R_5$ represents a nitrogen-containing heterocyclic group.

Incidentally, the above alkyl group, aryl group, alkylene group and phenylene group may also have an organo group having a nitrogen atom, or may have a substituent such as a halogen atom.

Any of these silicone oils may be used alone or in the form of a mixture of two or more types, or after their multiple treatment. Any of these may also be used in combination with treatment with the silane compound.

The treatment of the inorganic fine particles with the silane compound may be carried out by a commonly known method such as dry treatment in which inorganic fine particles made into cloud by agitation is allowed to react with a vaporized silane compound, or wet treatment in which inorganic fine particles are dispersed in a solvent and the silane compound is added dropwise thereto to carry out reaction.

The treatment of the inorganic fine particles with the silane compound may preferably be carried out by adding the treating agent in an amount of from 5 to 40 parts by weight, more preferably from 5 to 35 parts by weight, an still more preferably from 10 to 30 parts by weight, based on 100 parts by weight of the base material inorganic fine particles.

The treatment with oil may be in an amount of from 3 to 35 parts by weight based on 100 parts by weight of the base material inorganic fine particles. Such treatment is preferable because the treated particles may readily uniformly be dispersed when added to toner particles and the density decrease in a high-temperature and high-humidity environment can not easily occur.

Especially in the present invention, particularly preferably used are hydrophobic inorganic fine particles having been treated with hexamethyldisilazane and thereafter further treated with silicone oil. The treatment with hexamethyldisilazane is superior in the uniformity of treatment, and can provide a toner having a good fluidity. It, however, is not easy for the treatment with hexamethyldisilazane alone to make the charging stable in a high-temperature and high-humidity environment. On the other hand, the treatment with silicone oil can keep the charging high in the high-temperature and high-humidity environment, but may be difficult to carry out uniformly and require the silicone oil in a large quantity in an attempt to carry out uniform treatment, tending to result in a poor fluidity. The treatment with hexamethyldisilazane and subsequent further treatment with silicone oil enables uniform treatment in a small oil quantity, and hence enables achievement of both the high fluidity and the charging stability in high-temperature and high-humidity environment.

The hydrophobic inorganic fine particles of the present invention may be hydrophobic-treated, e.g., in the following way.

The base materials for the small-particle-diameter inorganic fine particles and large-particle-diameter inorganic fine particles are premixed in any desired weight ratio by means of a mixer such as a Henschel mixer, and the mixture obtained is put into a treating tank, or they are directly put into a treating tank in any desired weight ratio without being premixed. The materials in the treating tank are agitated by means of an agitation member such as agitation blades to mix the small-particle-diameter inorganic fine particles and the large-particle-diameter inorganic fine particles, during which the hexamethyldisilazane is dropwise added, or sprayed, in a stated quantity, and is thoroughly mixed. Here, the hexamethyldisilazane may be diluted with a solvent such as alcohol to carry out treatment. The base material inorganic fine particles thus mixed and dispersed and containing the treating agent stand a powder liquid formed. This powder liquid is heated to a temperature not lower than the boiling point of the hexamethyldisilazane (preferably from 150° C. to 250° C.) in an atmosphere of nitrogen, and refluxed for 0.5 to 5 hours with stirring. Thereafter, any surplus matter such as a surplus treating agent may optionally be removed.

As a method by which the surfaces of the base material inorganic fine particles is hydrophobic-treated with the silicone oil, any known technique may be used. For example, like the treatment with hexamethyldisilazane, the base materials for the small-particle-diameter inorganic fine particles and large-particle-diameter inorganic fine particles are premixed in any desired weight ratio by means of a mixer such as a Henschel mixer, and the mixture obtained is put into a treating tank, or they are directly put into a treating tank in any desired weight ratio without being premixed. The materials in the treating tank are agitated by means of an agitation member such as agitation blades to mix the small-particle-diameter inorganic fine particles and the large-particle-diameter inorganic fine particles, during which these inorganic fine particles and the silicone oil are mixed. The mixing with the silicone oil may be direct mixing carried out using a mixer such as a Henschel mixer, or a method may be used in which the silicone oil is sprayed on the base material inorganic fine particles. Alternatively, the silicone oil may be dissolved or dispersed in a suitable solvent, and thereafter this may be mixed with the base material inorganic fine particles, followed by removal of the solvent to prepare the treated product.

In the case when treated with both the silane compound and the silicone oil, a method may preferably be used in which the base material inorganic fine particles are treated with the silane compound and thereafter the silicone oil is sprayed, followed by heat treatment at 200° C. or more.

As a method used favorably in producing the hydrophobic inorganic fine particles of the present invention, it is a method in which the small-particle-diameter inorganic fine particles and the large-particle-diameter inorganic fine particles in any combination selected from any of i) untreated small-particle-diameter inorganic fine particles and untreated large-particle-diameter inorganic fine particles, ii) untreated small-particle-diameter inorganic fine particles and silane compound treated large-particle-diameter inorganic fine particles, iii) silane compound treated small-particle-diameter inorganic fine particles and untreated large-particle-diameter inorganic fine particles, and iv) silane compound treated small-particle-diameter inorganic fine particles and silane compound treated large-particle-diameter inorganic fine particles, are treated in the same treating tank to treat them simultaneously with the silane compound or silicone oil, or with both the silane compound and the silicone oil.

In particular, from the viewpoint of uniform mixing of the small-particle-diameter inorganic fine particles and the large-particle-diameter inorganic fine particles, the combination of untreated small-particle-diameter inorganic fine particles and untreated large-particle-diameter inorganic fine particles is most preferred.

As a method for carrying out the hydrophobic treatment to obtain the hydrophobic inorganic fine particles according to the present invention, a batch treatment method is preferable in which the base materials for the small-particle-diameter inorganic fine particles and large-particle-diameter inorganic fine particles are put into a batch in stated quantities, and these are agitated at a high speed to uniformly mix the base materials for the small-particle-diameter inorganic fine particles and large-particle-diameter inorganic fine particles, where the treatment of the mixture is carried out in the batch while being mixed. The hydrophobic inorganic fine particles thus obtained by the batch treatment method can be obtained in a good reproducibility as those having uniformly been treated and being stable in respect of quality.

What is particularly preferable as the hydrophobic treatment method is a method in which untreated small-particle-diameter inorganic fine particles and untreated large-particle-diameter inorganic fine particles are treated with the silane compound in a batch type treating tank, and thereafter the treated product is, without being taken out, further treated with the silicone oil in the same treating tank. This method is advantageous in view of uniform treatment and uniform dispersion.

In the present invention, of the inorganic fine particles having been hydrophobic-treated in this way, it is preferable to use hydrophobic inorganic fine particles having a methanol wettability of 60% or more, preferably 70% or more, and more preferably 75% or more. The methanol wettability represents the hydrophobicity (the degree of making hydrophobic) of the hydrophobic inorganic fine particles. It shows that, the higher the methanol wettability is, the higher the hydrophobicity is. If the hydrophobic inorganic fine particles have a methanol wettability of less than 60%, the hydrophobic inorganic fine particles tend to absorb moisture, and hence density decrease due to a decrease of charge quantity tends to occur when the toner is used over a long period of time in a high-temperature and high-humidity environment.

The hydrophobic inorganic fine particles of the present invention are applicable in toners such as color toners, monochrome toners, magnetic toners and non-magnetic toners. In regard to developing systems as well, the effect is obtainable in developing systems such as one-component development, two-component development, contact development and non-contact development.

In particular, the hydrophobic inorganic fine particles of the present invention may particularly preferably be used in an image forming method making use of a developer carrying member and a toner layer thickness control member which is kept in contact with the developer carrying member to control toner layer thickness. They further exhibit an especially superior effect when added to a toner used in an image forming method in which the process speed is 300 mm/second or more. In controlling the toner layer thickness in contact with the developer carrying member, the toner is strongly pressed against the developer carrying member by the toner layer thickness control member, and hence the mechanical load applied to the toner is very large. Especially in the case in which the process speed is 300 mm/second or more, the contact portion locally fairly rises in temperature because of friction. Hence, the toner is also rubbed in the state of high temperature, so that the inorganic fine particles adhering to the surfaces of toner particles tend to be buried, and the toner may deteriorate to cause density decrease.

The hydrophobic inorganic fine particles of the present invention may readily uniformly be dispersed on the surfaces of toner particles, and the effect of preventing deterioration that is attributable to the large-particle-diameter inorganic fine particles may readily be exhibited. Hence, the present invention can deal with a developing assembly having been made high-speed which has the toner layer thickness control member kept in contact with the developer carrying member to control toner layer thickness.

As the toner layer thickness control member, usable is a platelike rubber material of silicone, urethane or the like, a metallic elastic member of stainless steel, phosphor bronze or the like, or a rubber material backed with a metallic material. In particular, a developing blade made of urethane is preferred.

The toner of the present invention is a toner having at least i) toner particles having at least a binder resin and a colorant and ii) the hydrophobic inorganic fine particles. Here, the toner may preferably contain the hydrophobic inorganic fine particles in an amount of from 0.3% by weight to 5.0% by weight based on the total weight of the toner. If the hydrophobic inorganic fine particles are in a content of less than 0.3% by weight based on the total weight of the toner, the toner may have poor fluidity and chargeability. If on the other hand the hydrophobic inorganic fine particles are in a content of more than 5.0% by weight based on the total weight of the toner, it may come not easy to disperse the hydrophobic inorganic fine particles uniformly, or the toner may have a poor fixing performance.

As types of the binder resin used in the toner particles of the toner of the present invention, the binder resin may include styrene resins, styrene copolymer resins, polyester resins, polyol resins, polyvinyl chloride resins, phenol resins, natural resin modified phenol resins, natural resin modified maleic acid resins, acrylic resins, methacrylic resins, polyvinyl acetate resins, silicone resins, polyurethane resins, polyamide resins, furan resins, epoxy resins, xylene resins, polyvinyl butyral resins, terpene resins, cumarone indene resins, and petroleum resins. As preferred binder resins, they include polyester resins and styrene copolymer resins that has a small chargeability variation due to environment and superior fixing performance.

Comonomers copolymerizable with styrene monomers in the styrene copolymers may include styrene derivatives such as vinyl toluene; acrylic acid, and acrylates such as methyl acrylate, ethyl acrylate, butyl acrylate, dodecyl acrylate, octyl acrylate, 2-ethylhexyl acrylate and phenyl acrylate; methacrylic acid, and methacrylates such as methyl methacrylate, ethyl methacrylate, butyl methacrylate and octyl methacrylate; dicarboxylic acids having a double bond and esters thereof, such as maleic acid, butyl maleate, methyl maleate and dimethyl maleate; acrylamide, acrylonitrile, methacrylonitrile, and butadiene; vinyl esters such as vinyl chloride, vinyl acetate and vinyl benzoate; ethylenic olefins such as ethylene, propylene and butylene; vinyl ketones such as methyl vinyl ketone and hexyl vinyl ketone; and vinyl ethers such as methyl vinyl ether, ethyl vinyl ether and isobutyl vinyl ether. Any of these vinyl monomers may be used alone or in combination of two or more.

The binder resin in the present invention may have an acid value. Monomers which control the acid value of the binder resin may include, e.g., acrylic acids such as acrylic acid, methacrylic acid, α-ethylacrylic acid, crotonic acid, cinnamic acid, vinylacetic acid, isocrotonic acid and angelic acid, and α- or β-alkyl derivatives of these; and unsaturated dicarboxylic acids such as fumaric acid, maleic acid, citraconic acid, alkenylsuccinic acids, itaconic acid, mesaconic acid, dimethylmaleic acid and dimethylfumaric acid, and monoester derivatives or anhydrides of these. Any of these monomers may be used alone or in the form of a mixture, and may be copolymerized with other monomer to obtain the desired polymer. Of these, it is particularly preferable to use monoester derivatives of unsaturated dicarboxylic acids, in order to control the acid value.

Stated more specifically, they may include monoesters of α,β-unsaturated dicarboxylic acids, such as monomethyl maleate, monoethyl maleate, monobutyl maleate, monooctyl maleate, monoallyl maleate, monophenyl maleate, monomethyl fumarate, monoethyl fumarate, monobutyl fumarate and monophenyl fumarate; and monoesters of alkyenyldicarboxylic acids, such as monobutyl n-butenyl succinate, monomethyl n-octenyl succinate, monoethyl n-butenyl succinate, monomethyl n-dodecenyl glutarate, and monobutyl n-butenyl adipate.

The carboxyl-group-containing monomer as described above may preferably be added in an amount of from 0.1 to 20 parts by weight, and preferably from 0.2 to 15 parts by weight, based on 100 parts by weight of all monomers constituting the binder resin.

The binder resin according to the present invention may have a glass transition temperature (Tg) of from 45° C. to 80° C., and preferably from 50° C. to 70° C. If it has a Tg lower than 45° C., the toner may deteriorate in a high-temperature atmosphere or may cause offset at the time of fixing. If it has a Tg higher than 80° C., the toner tends to have a poor fixing performance.

Polymerization methods that may be used in the present invention as a method for synthesizing the binder resin in the present invention may include solution polymerization, emulsion polymerization and suspension polymerization.

Of these, the emulsion polymerization is a method in which a monomer almost insoluble in water is dispersed with an emulsifying agent in an aqueous phase in the form of small particles to carry out polymerization using a water-soluble polymerization initiator. This method enables easy control of reaction heat, and requires only a small rate of termination reaction because the phase where the polymerization is carried out (an oily phase formed of polymers and monomers) is separate from the aqueous phase, so that the polymerization rate is high, and a product with a high degree of polymerization can be obtained. Moreover, since the polymerization process is relatively simple and the polymerization product is in the form of fine particles, a colorant, a charge control agent and other additives can be mixed with ease when the toner is produced. For these reasons, this has an advantage as a production process for binder resins for toners. However, the polymer formed tends to become impure because of the emulsifying agent added, and an operation such as salting-out is required to take out the polymer. In order to avoid such difficulties, suspension polymerization are advantageous.

In the suspension polymerization, the reaction may preferably be carried out using a monomer in an amount of not more than 100 parts by weight, and preferably from 10 to 90 parts by weight, based on 100 parts by weight of an aqueous solvent. Usable dispersants include polyvinyl alcohol, partially saponified polyvinyl alcohol, and calcium phosphate, any of which may usually be used in an amount of from 0.05 to 1 part by weight based on 100 parts by weight of the aqueous solvent. Polymerization temperature may be from 50° C. to 95° C. as a suitable range, and may appropriately be selected depending on the initiator used and the intended polymer.

The binder resin used in the present invention may preferably be produced using a polyfunctional polymerization initiator alone or in combination with a monofunctional polymerization initiator which are as exemplified below.

As specific examples of a polyfunctional polymerization initiator having a polyfunctional structure, it may include polyfunctional polymerization initiators having in one molecule two or more functional groups such as peroxide groups, having a polymerization initiating function, as exemplified by 1,1-di-t-butylperoxy-3,3,5-trimethylcyclohexane, 1,3-bis(t-butylperoxyisopropyl)benzene, 2,5-dimethyl-2,5-(t-butylperoxy)hexane, 2,5-dimethyl-2,5-di-(t-butylperoxy)hexane, tris-(t-butylperoxy)triazine, 1,1-di-t-butylperoxycyclohexane, 2,2-di-t-butylperoxybutane, 4,4-di-t-butylperoxyvaleric acid-n-butyl ester, di-t-butyl peroxyhexahydroterephthalate, di-t-butyl peroxyazelate, di-t-butyl peroxytrimethyladipate, 2,2-bis(4,4-di-t-butylperoxycyclohexyl)propane, 2,2-di-t-butylperoxyoctane, and various polymer oxides; and polyfunctional polymerization initiators having in one molecule both a functional group such as a peroxide group, having a polymerization initiating function, and a polymerizable unsaturated group, as exemplified by diallyl peroxydicarbonate, t-butyl peroxymaleate, t-butyl peroxyallylcarbonate, and t-butyl peroxyisopropylfumarate.

Of these, more preferred ones are 1,1-di-t-butylperoxy-3,3,5-trimethylcyclohexane, 1,1-di-t-butylperoxycyclohexane, di-t-butyl peroxyhexahydroterephthalate, di-t-butyl peroxyazelate, 2,2-bis(4,4-di-t-butylperoxycyclohexyl)propane, and t-butyl peroxyallylcarbonate.

In order to satisfy various performances required as binders for toners, any of these polyfunctional polymerization initiators may preferably be used in combination with a monofunctional polymerization initiator. In particular, it may preferably be used in combination with a polymerization initiator having a half-life of 10 hours which is lower than the decomposition temperature necessary for the polyfunctional polymerization initiator to obtain a half-life of 10 hours.

Such a monofunctional polymerization initiator may specifically include organic peroxides such as benzoylperoxide, 1,1-di(t-butylperoxy)-3,3,5-trimethylcyclohexane, n-butyl-4,4-di(t-butylperoxy)valerate, dicumyl peroxide, α,α'-bis(t-butylperoxydiisopropyl)benzene, t-butylperoxycumene, and di-t-butyl peroxide; and azo or diazo compounds such as azobisisobutylonitrile and diazoaminoazobenzene.

Any of these monofunctional polymerization initiators may be added in the monomer at the same time the polyfunctional polymerization initiator is added. In order to keep a proper efficiency of the polyfunctional polymerization initiator, the monofunctional polymerization initiator may preferably be added after the half-life the polyfunctional polymerization initiator shows has lapsed in the polymerization step.

Any of these polymerization initiators may preferably be added in an amount of 0.05 to 2 parts by weight based on 100 parts by weight of the monomer, in view of efficiency.

It is also preferable for the binder resin to have been cross-linked with a cross-linkable monomer.

As the cross-linkable monomer, a monomer having two or more polymerizable double bonds may chiefly be used. As specific examples, it may include aromatic divinyl compounds as exemplified by divinylbenzene and divinylnaphthalene; diacrylate compounds linked with an alkyl chain, as exemplified by ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, and the above compounds whose acrylate moiety has been replaced with methacrylate; diacrylate compounds linked with an alkyl chain containing an ether linkage, as exemplified by diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and the above compounds whose acrylate moiety has been replaced with methacrylate; diacrylate compounds linked with a chain containing an aromatic group and an ether linkage, as exemplified by polyoxyethylene(2)-2,2-bis(4-hydroxyphenyl)propane diacrylate, polyoxyethylene(4)-2,2-bis(4-hydroxyphenyl)propane diacrylate, and the above compounds whose acrylate moiety has been replaced with methacrylate; and polyester type diacrylate compounds as exemplified by MANDA (trade name; available from Nippon Kayaku Co., Ltd.).

As a polyfunctional cross-linking agent, it may include pentaerythritol acrylate, trimethylolethane triacrylate, trimethylolpropane triacrylate, tetramethylolpropane triacrylate, tetramethylolmethane tetraacrylate, oligoester acrylate, and the above compounds whose acrylate moiety has been replaced with methacrylate; triallylcyanurate, and triallyltrimellitate.

Any of these cross-linking agents may preferably be used in an amount of from 0.00001 to 1 part by weight, and preferably from 0.001 to 0.05 part by weight, based on 100 parts by weight of other monomer components.

Of these cross-linkable monomers, monomers preferably usable in view of fixing performance and anti-offset properties of the toner are aromatic divinyl compounds (in particular, divinylbenzene) and diacrylate compounds linked with a chain containing an aromatic group and an ether linkage.

As other synthesis methods, bulk polymerization and solution polymerization may be used. In the bulk polymerization, polymers with a low-molecular weight can be obtained by carrying out polymerization at a high temperature and accelerating the rate of termination reaction, but there is the problem of a difficulty in controlling the reaction. In this regard, the solution polymerization is preferable because polymers with a desired molecular weight can be obtained with ease under mild conditions, utilizing a difference in chain transfer of radicals that is caused by a solvent, and controlling the quantity of initiators and the reaction temperature. In particular, solution polymerization carried out under pressure conditions is also preferable in view of advantages that the initiator may be used in a quantity kept minimum and the fact that the remaining initiator can be kept as far as possible from exercising influence.

The polyester resin used in the present invention has the composition as shown below.

As a dihydric alcohol component, it may include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, a bisphenol or bisphenol derivative represented by the following Formula (A):

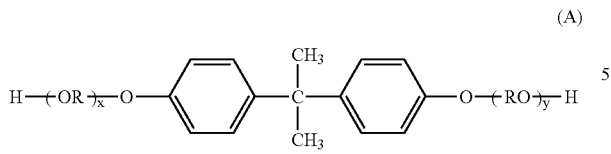
(A)

wherein R represents an ethylene group or a propylene group, x and y are each an integer of 0 or more, and an average value of x+y is 0 to 10; and a diol represented by the following Formula (B):

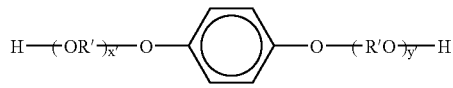
(B)

wherein R' represents

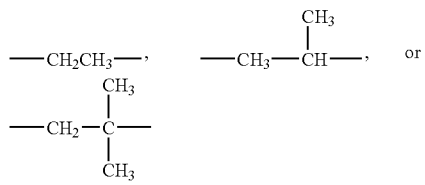

x' and y' are each independently an integer of 0 or more, and an average value of x'+y' is 0 to 10.

As a dibasic acid, it may include dicarboxylic acids and derivatives thereof, as exemplified by benzene dicarboxylic acids or anhydrides thereof, such as phthalic acid, terephthalic acid, isophthalic acid and phthalic anhydride, or lower alkyl esters thereof; alkyldicarboxylic acids such as succinic acid, adipic acid, sebacic acid and azelaic acid, or anhydrides or lower alkyl esters thereof; alkenylsuccinic acids or alkylsuccinic acids, such as n-dodecenylsuccinic acid and n-dodecylsuccinic acid, or anhydrides or lower alkyl esters thereof; unsaturated dicarboxylic acids such as fumaric acid, maleic acid, citraconic acid and itaconic acid, or anhydrides or lower alkyl esters thereof.

A trihydric or higher alcohol component and a tribasic or higher acid component serving also as a cross-linking component may preferably be used alone or may be used in combination.

The trihydric or higher, polyhydric alcohol component may include, e.g., sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane and 1,3,5-trihydroxybenzene.

The tribasic or higher, polycarboxylic acid component in the present invention may include polybasic carboxylic acids and derivatives thereof as exemplified by trimellitic acid, pyromellitic acid, 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, tetra(methylenecarboxyl)methane, 1,2,7,8-octanetetracarboxylic acid, Empol trimer acid, and anhydrides or lower alkyl esters of these; and a tetracarboxylic acid represented by the following formula (C):

(C)

(wherein X represents an alkylene group or alkenylene group having 5 to 30 carbon atoms which may have at least one side chain having 1 or more carbon atoms), and anhydrides or lower alkyl esters thereof.

In the polyester resin used in the present invention, the alcohol component may be in a proportion of from 40 to 60 mol %, and preferably from 45 to 55 mol %; and the acid component, from 60 to 40 mol %, and preferably from 55 to 45 mol %. The trihydric or -basic or higher, polyhydric or -basic component may preferably be in a proportion of from 5 to 60 mol % of the whole components.

The polyester resin is usually obtained by commonly known condensation polymerization.

The toner of the present invention may contain a wax.

The wax used in the present invention may include the following. It may include, e.g., aliphatic hydrocarbon waxes such as low-molecular weight polyethylene, low-molecular weight polypropylene, polyolefin copolymer, polyolefin wax, microcrystalline wax, paraffin wax and Fischer-Tropsch wax; oxides of aliphatic hydrocarbon waxes, such as polyethylene oxide wax; or block copolymers of these; vegetable waxes such as candelilla wax, carnauba wax, japan wax (haze wax) and jojoba wax; animal waxes such as bees wax, lanolin and spermaceti; mineral waxes such as ozokelite, serecin and petrolatum; waxes composed chiefly of a fatty ester, such as montanate wax and castor wax; and those obtained by subjecting part or the whole of a fatty ester to deoxydation, such as deoxidized carnauba was. It may further include saturated straight-chain fatty acids such as palmitic acid, stearic acid, montanic acid and also long-chain alkylcarboxylic acids having a long-chain alkyl group; unsaturated fatty acids such as brassidic acid, eleostearic acid and parinaric acid; saturated alcohols such as stearyl alcohol, eicosyl alcohol, behenyl alcohol, carnaubyl alcohol, ceryl alcohol, melissyl alcohol and also long-chain alkyl alcohols having a long-chain alkyl group; polyhydric alcohols such as sorbitol; fatty acid amides such as linolic acid amide, oleic acid amide and lauric acid amide; saturated fatty bisamides such as methylenebis(stearic acid amide), ethylenebis(capric acid amide), ethylenebis(lauric acid amide) and hexamethylenebis(stearic acid amide); unsaturated fatty acid amides such as ethylenebis(oleic acid amide), hexamethylenebis(oleic acid amide), N,N'-dioleyladipic acid amide and N,N'-dioleylsebasic acid amide; aromatic bisamides such as m-xylenebisstearic acid amide and N,N'-distearylisophthalic acid amide; fatty acid metal salts (those commonly called metal soap) such as calcium stearate, calcium laurate, zinc stearate and magnesium stearate; grafted waxes obtained by grafting vinyl monomers such as styrene and acrylic acid to fatty acid hydrocarbon waxes; partially esterified products of polyhydric alcohols with fatty acids, such as monoglyceride behenate; and methyl esterified products having a hydroxyl group, obtained by hydrogenation of vegetable fats and oils.

Also preferably usable are those obtained by subjecting any of these waxes to press sweating, solvent fractionation, recrystallization, vacuum distillation, utracrytical gas extraction or molten-liquid crystallization to make their molecular-weight distribution sharp, low-molecular weight solid fatty acids, low-molecular weight solid alcohols, low-molecular weight solid compounds, and other waxes from which impurities have been removed.

As specific examples of the wax usable as a release agent, it may include VISCOL® 330-P, 550-P, 660-P, TS-200 (available from Sanyo Chemical Industries, Ltd.); HIWAX 400P, 200P, 100P, 410P, 420P, 320P, 220P, 210P, 110P (available from Mitsui Chemicals, Inc.); SASOL $H_1$, $H_2$, C80, C105, C77 (available from Schumann Sasol Co.); HNP-1, HNP-3, HNP-9, HNP-10, HNP-11, HNP-12 (available from Nippon Seiro Co., Ltd.); UNILIN® 350, 425, 550, 700, UNICID® 350, 425, 550, 700 (available from Toyo-Petrolite Co., Ltd.); and japan wax, bees wax, rice wax, candelilla wax, carnauba wax (available from CERARICA NODA Co., Ltd.).

The toner of the present invention may also be incorporated with a magnetic material so that it can be used as a magnetic toner. In this case, the magnetic material may also serve as the colorant.

In the present invention, the magnetic material to be contained in the magnetic toner may include iron oxides such as magnetite, maghemite and ferrite; metals such as iron, cobalt and nickel, or alloys of any of these metals with a metal such as aluminum, cobalt, copper, lead, magnesium, tin, zinc, antimony, beryllium, bismuth, cadmium, calcium, manganese, selenium, titanium, tungsten or vanadium, and mixtures of any of these.

These magnetic materials may preferably be those having an average particle diameter of 2 μm or less, and preferably from 0.05 μm to 0.5 μm. The magnetic material may preferably be incorporated in the toner in an amount of from 20 to 200 parts by weight, and particularly preferably from 40 to 150 parts by weight, based on 100 parts by weight of the resin component.

As the colorant used in the present invention, carbon black, grafted carbon black, and a colorant toned in black by the use of yellow, magenta and cyan colorants shown below may be used as black colorants.

As yellow colorants, compounds typified by condensation azo compounds, isoindolinone compounds, anthraquinone compounds, azo metal complexes, methine compounds and allylamide compounds are used.

As magenta colorants, condensation azo compounds, diketopyrrolopyrrole compounds, anthraquinone compounds, quinacridone compounds, basic dye lake compounds, naphthol compounds, benzimidazolone compounds, thioindigo compounds and perylene compounds are used.

As cyan colorants, copper phthalocyanine compounds and derivatives thereof, anthraquinone compounds and basic dye lake compounds may be used.

Any of these colorants may be used alone, in the form of a mixture, or in the state of a solid solution. The colorants used in the present invention are selected taking account of hue angle, chroma, brightness, weatherability, transparency on OHP films and dispersibility in toner particles. The colorant may preferably be used in an amount of from 1 to 20 parts by weight based on 100 parts by weight of the binder resin.

Processes for producing the toner of the present invention are described below. The toner of the present invention may be produced by a pulverization toner production process and a polymerization toner production process.

The toner of the present invention may be used in combination with a carrier so as to be used as a two-component developer. As the carrier used in two-component development, a conventionally known carrier may be used. Stated specifically, usable are metals such as iron, nickel, cobalt, manganese, chromium and rare earth elements, and alloys or oxides thereof, having been surface-oxidized or unoxidized, and having an average particle diameter of from 20 μm to 300 μm.

Also preferably usable are any of these carrier particles on the surfaces of which a material such as a styrene resin, an acrylic resin, a silicone resin, a fluorine resin or a polyester resin has been deposited or coated.

The toner of the present invention may preferably be incorporated with a charge control agent. A charge control agent capable of controlling the toner to be negatively chargeable includes the following materials.

For example, organic metal salts and chelate compounds are effective, including monoazo metal compounds, acetylyacetone metal compounds, aromatic hydroxycarboxylic acid and aromatic dicarboxylic acid type metal compounds. Besides, they also include aromatic hydroxycarboxylic acid, aromatic mono- and polycarboxylic acids, and metal salts, anhydrides or esters thereof, and phenol derivatives such as bisphenol.

An azo type metal compound represented by the formula (1) shown below is preferred.

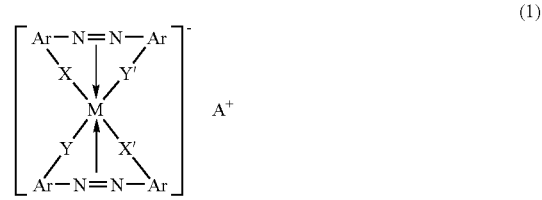

(1)

In the formula, M represents a central metal, which may specifically include Sc, Ti, V, Cr, Co, Ni, Mn or Fe. Ar represents an arylene group, including a phenylene group or a naphthylene group, which may have a substituent. The substituent includes a nitro group, a halogen atom, a carboxyl group, an anilide group, and an alkyl group or alkoxyl group having 1 to 18 carbon atoms. X, X', Y and Y' each independently represent —O—, —CO—, —NH— or —NR— (R is an alkyl group having 1 to 4 carbon atoms). $A^+$ represents a counter ion, and specifically represents a hydrogen ion, a sodium ion, a potassium ion, an ammonium, an aliphatic ammonium ion or nothing.

As the central metal in the above formula (1), Fe or Cr is particularly preferred. As the substituent substituted on the arylene group in the above formula (1), a halogen atom, an alkyl group or an anilide group is preferred. As the counter ion in the above formula (1), a hydrogen ion, an alkali metal ammonium ion or an aliphatic ammonium ion is preferred. A mixture of compounds having different counter ions may also preferably be used.

Besides, a basic organic acid metal compound represented by the formula (2) shown below is also capable of imparting negative chargeability, and may be used in the present invention.

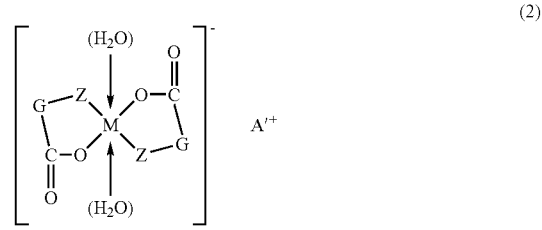

(2)

In the formula, M represents a central metal of coordination, which may specifically include Cr, Co, Ni, Mn, Fe, Zn, Al, B or Zr. Z represents —O— or —CO—O—. G represents an arylene group which may have a substituent, specifically representing:

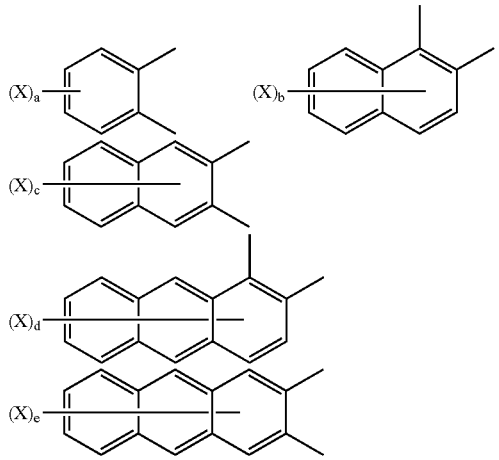

(in the formula, X is a substituent, and represents a hydrogen atom, a halogen atom, a nitro group or an alkyl group, and a represents an integer of 1 to 4, b an integer of 1 to 6, c an integer of 1 to 6, d an integer of 1 to 8, and e an integer of 1 to 8), or:

(in the formula, R represents a hydrogen atom, an alkyl group having 1 to 18 carbon atoms or an alkenyl group having 2 to 18 carbon atoms). $A'^+$ represents a counter ion, and specifically represents a hydrogen ion, a sodium ion, a potassium ion, an ammonium, an aliphatic ammonium ion or nothing.

As the central metal in the formula (2), Fe, Cr, Si, Zn, Zr or Al is particularly preferred. As the substituent that may be substituted on the arylene group in the above formula (2), an alkyl group, an anilide group, an aryl group or a halogen atom is preferred. As the counter ion in the formula (2), a hydrogen ion, an ammonium ion or an aliphatic ammonium ion is preferred.

Of these, the azo type metal compound represented by the formula (1) is more preferred. In particular, an azo type iron compound represented by the following formula (3) is most preferred.

wherein $X_1$ and $X_2$ each represent a hydrogen atom, a lower alkyl group, a lower alkoxyl group, a nitro group or a halogen atom, and m and m' each represent an integer of 1 to 3; $Y_1$ and $Y_3$ each represent a hydrogen atom, an alkyl group having 1 to 18 carbon atoms, an alkenyl group having 2 to 18 carbon atoms, a sulfonamide group, a mesyl group, a sulfonic acid group, a carboxyester group, a hydroxyl group, an alkoxyl group having 1 to 18 carbon atoms, an acetylamino group, a benzoyl group, an amino group or a halogen atom; n and n' each represent an integer of 1 to 3; and $Y_2$ and $Y_4$ each represent a hydrogen atom or a nitro group; (the above $X_1$ and $X_2$, m and m', $Y_1$ and $Y_3$, n and n', and $Y_2$ and $Y_4$ may be the same or different); and $A^+$ represents an ammonium ion, an alkali metal ion, a hydrogen ion or a mixed ion of any of these.

Specific examples of the azo type iron compound are shown below.

Azo Type Iron Compound (1)

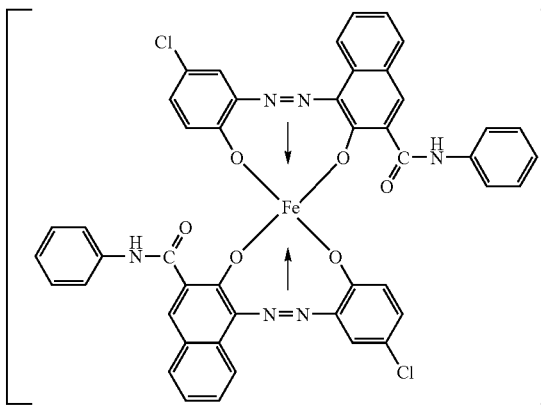

$NH_4^+$ (or $H^+$, $Na^+$, $K^+$ or a mixed ion of any of these)

Azo Type Iron Compound (2)

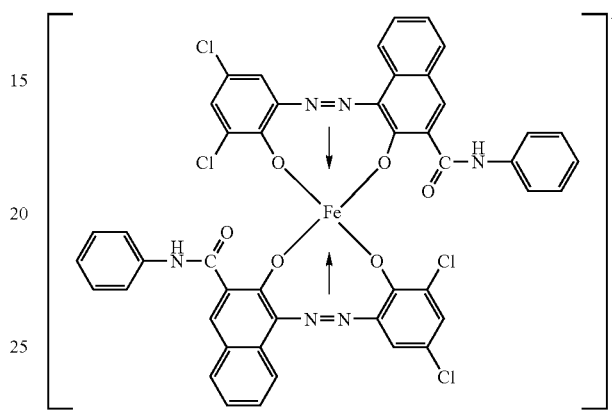

$NH_4^+$ (or $H^+$, $Na^+$, $K^+$ or a mixed ion of any of these)

Azo Type Iron Compound (3)

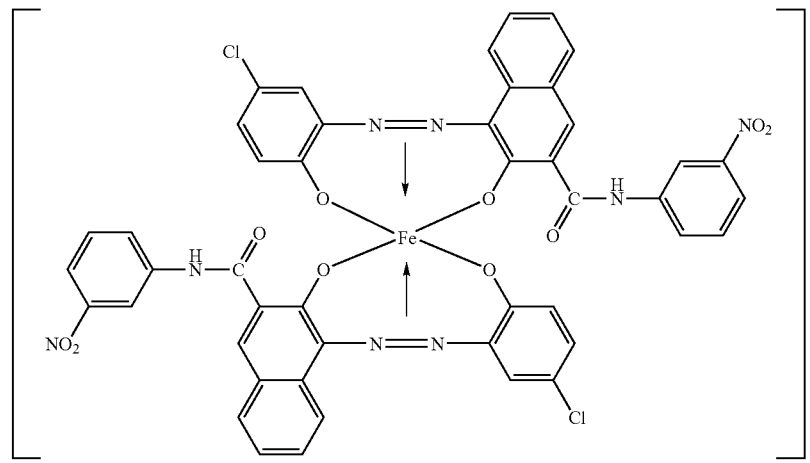

$NH_4^+$ (or $H^+$, $Na^+$, $K^+$ or a mixed ion of any of these)
Azo Type Iron Compound (4)
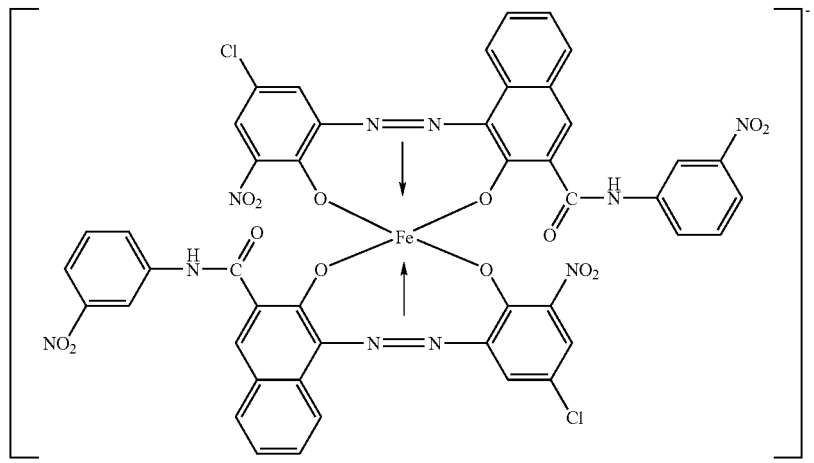
$NH_4^+$ (or $H^+$, $Na^+$, $K^+$ or a mixed ion of any of these)
Azo Type Iron Compound (5)
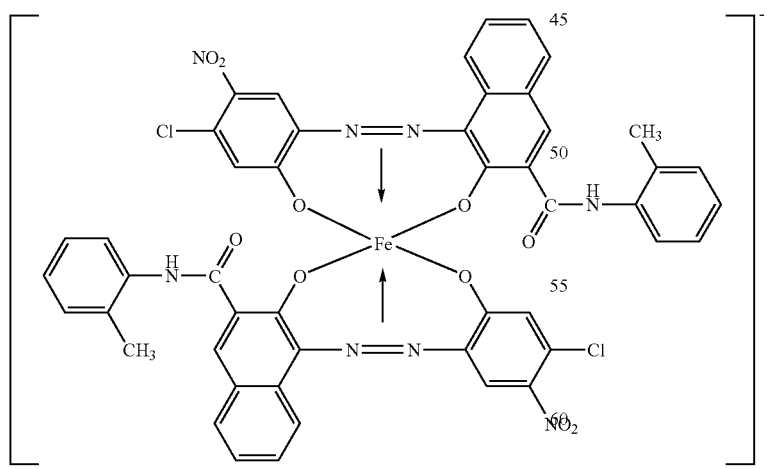

$NH_4^+$ (or $H^+$, $Na^+$, $K^+$ or a mixed ion of any of these)

Azo Type Iron Compound (6)

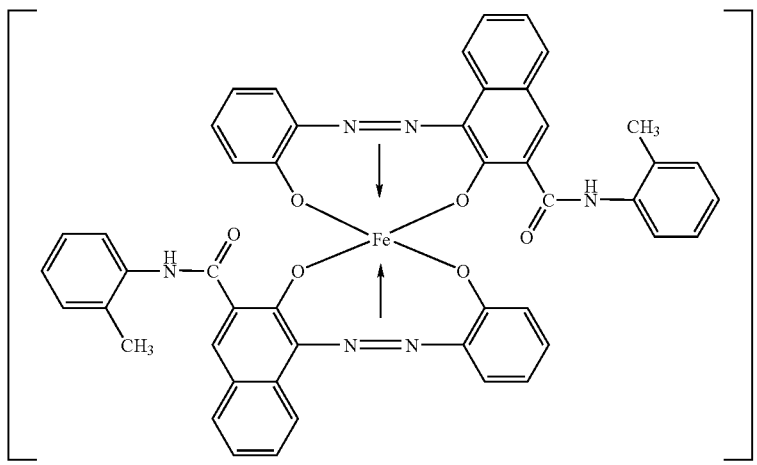

$NH_4^+$ (or $H^+$, $Na^+$, $K^+$ or a mixed ion of any of these)

A charge control agent capable of controlling the toner to be positively chargeable includes the following materials.

Nigrosine and products modified with a fatty acid metal salt; quaternary ammonium salts such as tributylbenzylammonium 1-hydroxy-4-naphthosulfonate and tetrabutylammonium teterafluoroborate, and analogues of these, i.e., onium salts such as phosphonium salts, and lake pigments of these, triphenylmethane dyes and lake pigments of these (lake-forming agents include tungstophosphoric acid, molybdophosphoric acid, tungstomolybdophosphoric acid, tannic acid, lauric acid, gallic acid, ferricyanic acid and ferrocyanic acid), and metal salts of higher fatty acids; diorganotin oxides such as dibutyltin oxide, dioctyltin oxide and dicyclohexyltin oxide; and diorganotin borates such as dibutyltin borate, dioctyltin borate and dicyclohexyltin borate; guanidine compounds, and imidazole compounds. Any of these may be used alone or in combination of two or more kinds. Of these, triphenylmethane compounds, and quaternary ammonium salts whose counter ions are not halogens may preferably be used. Homopolymers of monomers represented by the following formula (4):

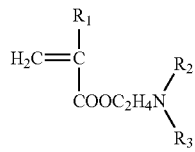

(4)

wherein $R_1$ represents a hydrogen atom or a methyl group; $R_2$ and $R_3$ each represent a substituted or unsubstituted alkyl group (preferably having 1 to 4 carbon atoms);

or copolymers of the monomers with polymerizable monomers such as styrene, acrylates or methacrylates as described above may also be used as positive charge control agents. In this case, these charge control agents may also act as binder resins (as a whole or in part).

In particular, a compound represented by the following formula (5) is preferred in the constitution of the present invention.

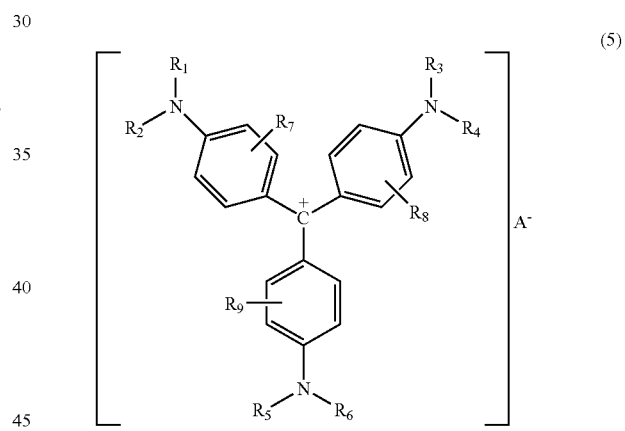

(5)

wherein $R_1$, $R_2$, $R_3$, $R_4$, $R_5$ and $R_6$ may be the same or different from one another and each represent a hydrogen atom, a substituted or unsubstituted alkyl group or a substituted or unsubstituted aryl group; $R_7$, $R_8$ and $R_9$ may be the same or different from one another and each represent a hydrogen atom, a halogen atom, an alkyl group or an alkoxyl group; and $A^-$ represents a negative ion selected from a sulfate ion, a nitrate ion, a borate ion, a phosphate ion, a hydroxide ion, an organic sulfate ion, an organic sulfonate ion, an organic phosphate ion, a carboxylate ion, an organic borate ion, and tetrafluorborate.

Those preferable as agents for negative charging may include, e.g., Spilon Black TRH, T-77, T-95 (available from Hodogaya Chemical Co., Ltd.); BONTRON® S-34, S-44, S-54, E-84, E-88, E-89 (available from Orient Chemical Industries Ltd.). Those preferable as agents for positive charging may include, e.g., TP-302, TP-415 (available from Hodogaya Chemical Co., Ltd.); BONTRON® N-01, N-04, N-07, P-51 (available from Orient Chemical Industries Ltd.), Copy Blue PR (Klariant GmbH).

As methods for incorporating the toner with the charge control agent, available are a method of adding it internally to toner particles and a method of adding it externally to toner particles. The amount of the charge control agent used depends on the type of the binder resin, the presence or absence of any other additives, and the manner by which the toner is produced, including the manner of dispersion, and can not absolutely be specified. Preferably, the charge control agent may be used in an amount ranging from 0.1 to 10 parts by weight, and more preferably from 0.1 to 5 parts by weight, based on 100 parts by weight of the binder resin.

To produce the toner of the present invention, in the case of the pulverization toner, a mixture containing at least the binder resin and the colorant is used as a material, where the magnetic material, the wax, the charge control agent and other additives are optionally used. These materials are thoroughly mixed by means of a mixing machine such as a Henschel mixer or a ball mill, thereafter the mixture obtained is melt-kneaded by means of a heat kneader such as a heat roll kneader or an extruder to make the resins melt one another, in which the wax and the magnetic material are dispersed, and this kneaded product is cooled to solidify, followed by pulverization and classification. Thus, the toner can be obtained.

The toner of the present invention may be obtained using known production apparatus. For example, the following apparatus may be used according to conditions.

As the toner production apparatus, e.g., as the mixing machine, it may include Henschel Mixer (manufactured by Mitsui Mining & Smelting Co., Ltd.); Super Mixer (manufactured by Kawata MFG Co., Ltd.); Conical Ribbon Mixer (manufactured by Y. K. Ohkawara Seisakusho); Nauta Mixer, Turbulizer, and Cyclomix (manufactured by Hosokawa Micron Corporation); Spiral Pin Mixer (manufactured by Pacific Machinery & Engineering Co., Ltd.); and Rhedige Mixer (manufactured by Matsubo Corporation).

As the kneading machine, it may include, e.g., KRC Kneader (manufactured by Kurimoto, Ltd.); Buss-Kneader (manufactured by Coperion Buss Ag.); TEM-type Extruder (manufactured by Toshiba Machine Co., Ltd.); TEX Twin-screw Extruder (manufactured by The Japan Steel Works, Ltd.); PCM Kneader (manufactured by Ikegai Corp.); Three-Roll Mill, Mixing Roll Mill, and Kneader (manufactured by Inoue Manufacturing Co., Ltd.); Kneadex (manufactured by Mitsui Mining & Smelting Co., Ltd.); MS-type Pressure Kneader, and Kneader-Ruder (manufactured by Moriyama Manufacturing Co., Ltd.); and Banbury Mixer (manufactured by Kobe Steel, Ltd.).

As the grinding machine, it may include, e.g., Counter Jet Mill, Micron Jet, and Inomizer (manufactured by Hosokawa Micron Corporation); IDS-type Mill, and PJM Jet Grinding Mill (manufactured by Nippon Pneumatic MFG Co., Ltd.); Cross Jet Mill (manufactured by Kurimoto, Ltd.); Ulmax (manufactured by Nisso Engineering Co., Ltd.); SK Jet O-Mill (manufactured by Seishin Enterprise Co., Ltd.); Criptron (manufactured by Kawasaki Heavy Industries, Ltd); Turbo Mill (manufactured by Turbo Kogyo Co., Ltd.); and Super Rotor (manufactured by Nisshin Engineering Inc.).

As the classifier, it may include, e.g., Classyl, Micron Classifier, and Spedic Classifier (manufactured by Seishin Enterprise Co., Ltd.); Turbo Classifier (manufactured by Nisshin Engineering Inc.); Micron Separator, Turboprex(ATP), and TSP Separator (manufactured by Hosokawa Micron Corporation); Elbow Jet (manufactured by Nittetsu Mining Co., Ltd.); Dispersion Separator (manufactured by Nippon Pneumatic MFG Co., Ltd.); and YM Microcut (manufactured by Yasukawa Shoji K. K.).

As a sifter used to sieve coarse pparticles, it may include, e.g., Ultrasonics (manufactured by Koei Sangyo Co., Ltd.); Rezona Sieve, and Gyro Sifter (manufactured by Tokuju Corporation); Vibrasonic Sifter (manufactured by Dulton Company Limited); Sonicreen (manufactured by Shinto Kogyo K.K.); Turbo-Screener (manufactured by Turbo Kogyo Co., Ltd.); Microsifter (manufactured by Makino mfg. co., ltd.); and circular vibrating screens.

In the present invention, as methods for producing the polymerization toner, the toner may be produced by the method disclosed in Japanese Patent Publication No. S56-13945, in which a molten mixture is atomized or sprayed in air by means of a disk or multiple fluid nozzles to obtain a spherical toner; the method disclosed in Japanese Patent Publication No. S36-10231 and Japanese Patent Applications Laid-open No. S59-53856 and No. S59-61842, in which toners are directly produced by a suspension polymerization process; a dispersion polymerization method in which toner particles are directly produced using an aqueous organic solvent in which monomers are soluble and polymers obtained are insoluble; an emulsion polymerization method as typified by soap-free polymerization in which toner particles are produced by direct polymerization in the presence of a water-soluble polar polymerization initiator; and a hetero-agglomeration method in which primary polar emulsion polymerization particles are previously made and thereafter polar particles having reverse-polarity electric charges are added to effect association.

In the present invention, suspension polymerization under normal pressure or under pressure is particularly preferred, by which a fine-particle toner having a sharp particle size distribution can be obtained relatively with ease. What is called seed polymerization may also preferably be used in the present invention, which is a method in which a monomer is further adsorbed on polymerization particles obtained first and thereafter a polymerization initiator is used to effect polymerization.

When the direct polymerization is employed in the process for producing the toner of the present invention, the toner may specifically be produced by a production process as described below.

A monomer composition comprising the polymerizable monomer and mixed therein low-softening point substances, the colorant, the charge control agent, the polymerization initiator and other additives, which are uniformly dissolved or dispersed by means of a homogenizer or an ultrasonic dispersion machine, is dispersed in an aqueous medium containing a dispersion stabilizer, by means of a conventional stirrer, homomixer or homogenizer. Granulation is carried out preferably while controlling stirring speed and stirring time so that monomer droplets can have the desired toner particle size. After the granulation, stirring may be carried out to such an extent that the state of particles is maintained and the particles can be prevented from settling, by the action of the dispersion stabilizer. The polymerization may be carried out at a polymerization temperature set at 40° C. or more, usually from 50° C. to 90° C. At the latter half of the polymerization reaction, the temperature may be raised, and also the aqueous medium may be removed in part at the latter half of the reaction or after the reaction has been completed, in order to remove unreacted polymerizable monomers, by-products and so forth which may cause the smell at the time of fixing. After the reaction has been completed, the toner particles formed are collected by washing and filtration, followed by drying. In the case of suspension polymerization, water may preferably be used usually in an amount of from 300 to 3,000 parts by weight based on 100 parts by weight of the monomer composition.

As a vinyl type polymerizable monomer capable of radical polymerization which is used when the toner of the present invention is produced by the polymerization process, a monofunctional polymerizable monomer or a polyfunctional polymerizable monomer may be used.

The monofunctional polymerizable monomer may include styrene type polymerizable monomers such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene; acrylate type polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, dibutyl phosphate ethyl acrylate and 2-benzoyloxyethyl acrylate; methacrylate type polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate and dibutyl phosphate ethyl methacrylate; methylene aliphatic monocarboxylates; vinyl esters such as vinyl acetate, vinyl propionate, vinyl benzoate, vinyl butyrate and vinyl formate; vinyl ethers such as methyl vinyl ether, ethyl vinyl ether and isobutyl vinyl ether; and vinyl ketones such as methyl vinyl ketone, hexyl vinyl ketone and isopropyl vinyl ketone.

The polyfunctional polymerizable monomer may include diethylene glycol diacrylate, triethylene glycol diacrylate, tetraethylene glycol diacrylate, polyethylene glycol diacrylate, 1,6-hexanediol diacrylate, neopentyl glycol diacrylate, tripropylene glycol diacrylate, polypropylene glycol diacrylate, 2,2'-bis[4-(acryloxy•diethoxy)phenyl]propane, trimethyrolpropane triacrylate, tetramethyrolmethane tetraacrylate, ethylene glycol dimethacrylate, diethylene glycol dimethacrylate, triethylene glycol dimethacrylate, tetraethylene glycol dimethacrylate, polyethylene glycol dimethacrylate, 1,3-butylene glycol dimethacrylate, 1,6-hexanediol dimethacrylate, neopentyl glycol dimethacrylate, polypropylene glycol dimethacrylate, 2,2'-bis[4-(methacryloxy•diethoxy)phenyl]propane, 2,2'-bis[4-(methacryloxy•polyethoxy)phenyl]propane, trimethyrolpropane trimethacrylate, tetramethyrolmethane tetramethacrylate, divinyl benzene, divinyl naphthalene, and divinyl ether.

The above monofunctional polymerizable monomer may be used alone or in combination of two or more, or the above monofunctional polymerizable monomer and polyfunctional polymerizable monomer may be used in combination. The polyfunctional polymerizable monomer may also be used as a cross-linking agent.

In the present invention, in order to form a core/shell structure in the toner particles, a polar resin may preferably be used in combination. The polar resin, including polar polymers and polar copolymers, usable in the present invention is exemplified below.

The polar resin may include polymers of nitrogen-containing monomers such as dimethylaminoethyl methacrylate and diethylaminoethyl methacrylate, or copolymers of nitrogen-containing monomers with styrene-unsaturated carboxylates; nitrile monomers such as acrylonitrile; halogen-containing monomers such as vinyl chloride; unsaturated carboxylic acid monomers such as acrylic acid and methacrylic acid; unsaturated dibasic acid monomers; unsaturated dibasic acid anhydride monomers; polymers of nitro monomers, or copolymers of nitro monomers with styrene monomers; polyesters; and epoxy resins. More preferred examples are a copolymer of styrene with acrylic or methacrylic acid, a styrene-maleic acid copolymer, saturated or unsaturated polyester resins, and epoxy resins.

The polymerization initiator may include, e.g., azo or diazo type polymerization initiators such as 2,2'-azobis-(2,4-dimethylvaleronitrile), 2,2'-azobisisobutyronitrile), 1,1'-azobis-(cyclohexane-1-carbonitrile), 2,2'-azobis-4-methoxy-2,4-dimethylvaleronitrile and azobisisobutyronitrile; peroxide type initiators such as benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis(4,4-t-butylperoxycyclohexyl)propane, and tris-(t-butoxyperoxy)triazine; polymeric initiators having a peroxide in the side chain; persulfates such as potassium persulfate and ammonium persulfate; and hydrogen peroxide.

Any of the polymerization initiators may preferably be added in an amount of from 0.5 to 20 parts by weight based on 100 parts by weight of the polymerizable monomer, and may be used alone or in combination.

In order to control molecular weight, any known cross-linking agent and chain transfer agent may also be added, which may preferably be added in an amount of from 0.001 to 15 parts by weight based on 100 parts by weight of the polymerizable monomers.

In the dispersion medium used when the polymerization toner is produced, some suitable dispersion stabilizer is used in accordance with emulsion polymerization, dispersion polymerization, suspension polymerization, seed polymerization, or polymerization carried out by heterogeneous agglomeration. For example, as an inorganic compound, it may include tricalcium phosphate, magnesium phosphate, aluminum phosphate, zinc phosphate, calcium carbonate, magnesium carbonate, calcium hydroxide, magnesium hydroxide, aluminum hydroxide, calcium metasilicate, calcium sulfate, barium sulfate, bentonite, silica and alumina. As an organic compound, usable are polyvinyl alcohol, gelatin, methyl cellulose, methyl hydroxypropyl cellulose, ethyl cellulose, carboxymethyl cellulose sodium salt, polyacrylic acid and salts thereof, starch, polyacrylamide, polyethylene oxide, a poly(hydroxystearic acid-g-methyl methacrylate-eu-acrylic acid) copolymer, and nonionic or ionic surface active agents.

When the emulsion polymerization and the polymerization carried out by heterogeneous agglomeration are used, anionic surface active agents, cationic surface active agents, amphoteric surface active agents and nonionic surface active agent are used. Any of these dispersion stabilizers may preferably be used in an amount of 0.2 to 30 parts by weight based on 100 parts by weight of the polymerizable monomer.

Of these dispersion stabilizers, when the inorganic compound is used, those commercially available may be used as they are. In order to obtain fine particles, however, the inorganic compound may also be so made as to be formed in the dispersion medium.

In order to finely disperse these dispersion stabilizers, a surface active agent may also be used in an amount of from 0.001 to 0.1 part by weight based on 100 parts by weight of the polymerizable monomer. This surface-active agent is to accelerate the intended action of the dispersion stabilizer. As specific examples thereof, it may include sodium dodecylbenzene sulfate, sodium tetradecyl sulfate, sodium pentadecyl sulfate, sodium octyl sulfate, sodium oleate, sodium laurate, potassium stearate and calcium oleate.

Methods for measuring physical properties of the hydrophobic inorganic fine particles of the present invention are shown below.

Measurement of average primary particle diameter of inorganic fine particles:

The average primary particle diameter of the inorganic fine particles of the present invention is determined using an electron microscope. Stated specifically, to measured their particle diameter, an image of inorganic fine particles is photographed at 200,000 magnifications by the use of a transmission electron microscope (TEM) to take an enlarged photograph, on which the particle diameter is measured. Particle diameters of 1,000 particles picked out at random are measured, and the average value of the measurements is regarded as the average primary particle diameter. Incidentally, the distance between parallel lines which are maximum among sets of parallel lines drawn tangentially to the contour of each primary particle of the fine particles is regarded as the particle diameter.

Methanol wettability of hydrophobic inorganic fine particles:

In the present invention, the methanol wettability of the hydrophobic inorganic fine particles, i.e., hydrophobic properties of the hydrophobic inorganic fine particles, is measured using a methanol drop transmittance curve. Stated specifically, e.g., a powder wettability tester WET-100P, manufactured by Rhesca Company, Limited, may be used as a measuring instrument, and the method exemplified below may be used as a specific measuring operation.

First, 70 ml of a water-containing methanol solution composed of 60% by volume of methanol and 40% by volume of water are put into a container, and are dispersed for 5 minutes by means of an ultrasonic disperser in order to remove air bubbles contained in the solution used for measurement. To this solution, 0.06 g of the specimen hydrophobic inorganic fine particles are precisely weighed and added to prepare a sample fluid used for the measurement of hydrophobic properties of the hydrophobic inorganic fine particles.

Next, this sample fluid for measurement is stirred at a velocity of 6.67 $S^{-1}$, during which methanol is continuously added at a dropping rate of 1.3 ml/min., where its transmittance is measured through light of 780 nm in wavelength to draw a methanol drop transmittance curve as shown in FIG. 1. From this methanol drop transmittance curve, the methanol concentration at which the transmittance is 80% is regarded as the methanol wettability. Where the hydrophobic inorganic fine particles wet at a methanol concentration of less than 60% by volume, the transmittance at the light of 780 nm in wavelength lowers abruptly to come close to 0% just by mixing the hydrophobic inorganic fine particles in the mixed solvent and stirring them.

Incidentally, in this measurement, a flask is used which has a circular shape of 5 cm in diameter and made of glass of 1.75 mm in thickness, and a magnetic stirrer is used which has a spindle shape of 25 mm in length and 8 mm in maximum diameter and provided with a fluorine resin coating.

BET specific surface area of inorganic fine particles:

According to the BET method, nitrogen gas is adsorbed on the surface of a sample, using a specific surface area measuring instrument GEMINI 2375 Ver. 5.0 (manufactured by Shimadzu Corporation), and the BET specific surface area ($m^2$/g) is calculated using the BET multi-point method.

The present invention is described below in greater detail by giving Examples, which, however, by no means limit the present invention. In the following, the average primary particle diameter of fine particles means the average primary particle diameter in number-based particle size distribution. The maximum peak particle diameter of fine particles means the maximum peak particle diameter in number-based particle size distribution.

Hydrophobic Inorganic Fine Particles

PRODUCTION EXAMPLE 1

Into an autoclave with a stirrer, untreated dry-process silica (average primary particle diameter: 15 nm: maximum peak particle diameter: 13 nm; BET specific surface area: 200 $m^2$/g) as small-particle-diameter inorganic fine particles and untreated dry-process silica (average primary particle diameter: 36 nm: BET specific surface area: 50 $m^2$/g) as large-particle-diameter inorganic fine particles were introduced in a weight ratio of 10:1, and were heated to 200° C. in a fluidized state brought by stirring.

The inside of the reactor (autoclave) was displaced with nitrogen gas, and the reactor was closed, where hexamethyldisilazane was sprayed to the inside in an amount of 25 parts by weight based on 100 parts by weight of the base material silica, to carry out the treatment with silane compound in the state the silica was fluidized. This reaction was continued for 60 minutes, and thereafter the reaction was completed. After the reaction was completed, the inside of the autoclave was depressurized, and then cleaned with nitrogen gas streams to remove excess hexamethyldisilazane and by-products from hydrophobic silica.

Further, stirring the contents of the reactor, 10 parts by weight of dimethylsilicone oil (viscosity: 100 $mm^2$/g) was sprayed against 100 parts by weight of the base material silica. After the stirring was continued for 30 minutes, the product was heated to 300° C. with stirring, further stirred for 2 hours, and thereafter taken out to obtain Hydrophobic Inorganic Fine Particles 1. Physical properties of Hydrophobic Inorganic Fine Particles 1 obtained are shown in Table 1.

Hydrophobic Inorganic Fine Particles

PRODUCTION EXAMPLES 2 TO 16

Hydrophobic Inorganic Fine Particles 2 to 16 were prepared in the same manner as in Hydrophobic Inorganic Fine Particles Production Example 1 except that the inorganic fine particles and the surface treatment agent were changed as shown in Table 1.

Binder Resin

PRODUCTION EXAMPLE 1

50 parts by weight of a propylene oxide 2-mole addition product of bisphenol A represented by the following formula (A) (R represents a propylene group, and the average value of x+y is 2):

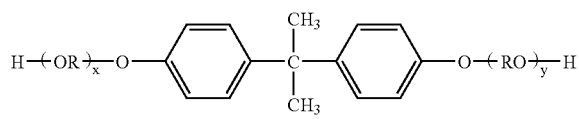

20 parts by weight of an ethylene oxide 2-mole addition product of bisphenol A represented by the above formula (A) (R represents an ethylene group, and the average value of x+y is 2), 20 parts by weight of terephthalic acid, 5 parts by weight of fumaric acid, 5 parts by weight of trimellitic anhydride and 0.5 part by weight of dibutyltin oxide were put into a reactor, and these were subjected to condensation polymerization at 220° C. to obtain Binder Resin 1 of polyester. This resin had a main-peak molecular weight of 8,300, a weight-average molecular weight (Mw) of 680,000, an acid value of 24 mg·KOH/g. a Tg of 59° C. and a THF-insoluble matter of 21% by weight.

Binder Resin

PRODUCTION EXAMPLE 2

300 parts by weight of xylene was introduced into a four-necked flask, and then heated and refluxed, where a liquid mixture of 75 parts by weight of styrene, 25 parts by weight of n-butyl acrylate and 2 parts of di-tert-butyl peroxide was dropwise added over a period of 5 hours to obtain a low-molecular weight polymer (L-1) solution. L-1 had a peak molecular weight of 12,000 and a weight-average molecular weight (Mw) of 15,400.

180 parts by weight of deaerated water and 20 parts by weight of a 2% by weight aqueous solution of polyvinyl alcohol were introduced into a four-necked flask, and thereafter a liquid mixture of 70 parts by weight of styrene, 30 parts by weight of n-butyl acrylate, 0.005 part by weight of divinylbenzene and 0.1 part by weight of 2,2-bis(4,4-di-tert-butylperoxycyclohexyl)propane (half-life 10-hour temperature: 92° C.) was added thereto, followed by stirring to prepare a suspension. The inside of the flask was sufficiently displaced with nitrogen gas, and the contents were heated to 85° C. to carry out polymerization, and this was retained for 24 hours. Thereafter, 0.1 part by weight of benzoyl peroxide (half-life 10-hour temperature: 72° C.) was additionally added, and this was further retained for 12 hours to complete polymerization to obtain a high-molecular weight polymer (H-1). H-1 had a peak molecular weight of 1,140,000 and a weight-average molecular weight (Mw) of 1,660,000.

Into 300 parts by weight of the low-molecular weight polymer (L-1) uniform solution, 25 parts by weight of the high-molecular weight polymer (H-1) were introduced, and these were thoroughly mixed under reflux, followed by removal of an organic solvent to obtain Binder Resin 2. This binder resin had a main-peak molecular weight of 12,000, a sub-peak molecular weight of 1,140,000 and an acid value of 0 mg·KOH/g.

| Production of Toner Particles 1 | |
|---|---|
| | (by weight) |
| Binder Resin 1 | 100 parts |
| Wax | 4 parts |
| (low-molecular weight polyethylene; DSC peak: 102° C.; Mn: 850) | |
| Magnetic iron oxide | 100 parts |
| (spherical; particle diameter: 0.2 μm) | |
| Exemplary Azo Type Iron Compound (1) | 2 parts |

The above-materials were premixed using a Henschel mixer, and thereafter the mixture obtained was kneaded by means of a twin-screw kneading extruder set to 130° C. and 200 rpm. The kneaded product obtained was cooled and thereafter crushed by means of a cutter mill. Thereafter, the crushed product obtained was finely pulverized using Turbo Mill (manufactured by Turbo Kogyo Co., Ltd.), controlling air temperature so that the exhaust temperature came to be 47° C., followed by classification by means of a multi-division classifier utilizing the Coanda effect, to obtain negatively chargeable magnetic toner particles, Toner Particles 1, with a weight-average particle diameter (D4) of 6.4 μm.

| Production of Toner Particles 2 | |
|---|---|
| | (by weight) |
| Binder Resin 2 | 100 parts |
| Magnetic iron oxide | 90 parts |
| (octahedral; particle diameter: 0.2 μm) | |
| Triphenylmethane lake pigment | 2 parts |
| Wax | 4 parts |
| (low-molecular weight polyethylene; DSC peak: 102° C.; Mn: 850) | |

The above materials were premixed, and thereafter the mixture obtained was kneaded by means of a twin-screw kneading extruder set to 110° C. and 150 rpm in number of revolutions of kneading shaft. The kneaded product obtained was cooled and thereafter crushed by means of a cutter mill. Thereafter, the crushed product obtained was finely pulverized using a fine grinding mill making use of jet streams, further followed by classification by means of an air classifier to obtain positively chargeable magnetic toner particles, Toner Particles 2, with a weight-average particle diameter (D4) of 7.3 μm.

EXAMPLE 1

To 100 parts by weight of Toner Particles 1, 1.1 parts by weight of Hydrophobic Inorganic Fine Particles 1 were externally added and mixed by means of a Henschel mixer to obtain Toner 1.

Figure 2:
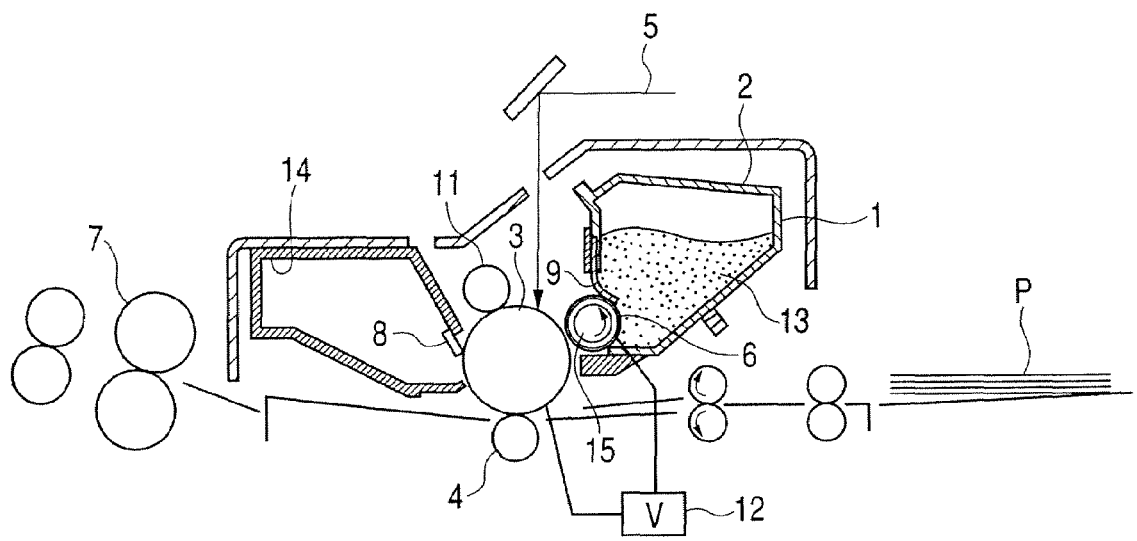
FIG. 2 is a schematic view showing an example of an image forming apparatus fit for forming images by the use of a magnetic toner of the present invention.
Figure 3:
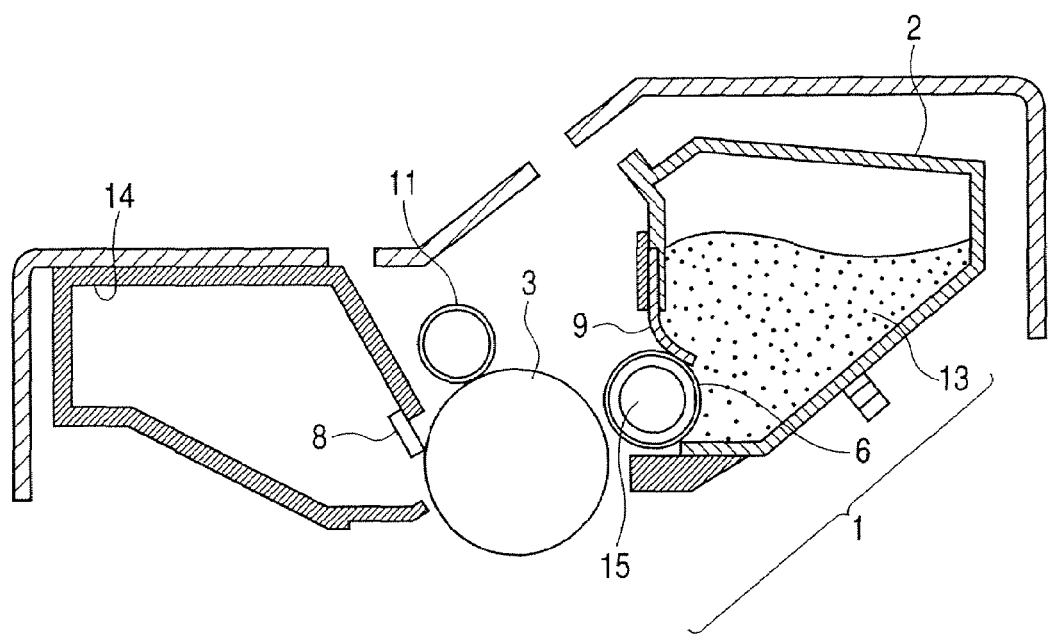
FIG. 3 is a schematic view showing an example of a process cartridge fit for forming images by the use of a magnetic toner of the present invention.

Using this Toner 1, a 30,000-sheet print test was conducted using as an image reproduction test machine a commercially available LBP (laser beam printer) (LASER JET 4300, manufactured by Hewlett-Packard Co.) which was so remodeled as to drive at A4-size 55sheets/minute (process speed of 325 mm/sec), in a low-temperature and low-humidity environment (L/L) of 15° C./10% RH, a normal-temperature and normal-humidity environment (N/N) of 23° C./60% RH and a high-temperature and high-humidity environment (H/H) of 35° C./80% RH, and in a mode which was so set that a horizontal-line pattern giving a print percentage of 1% was printed on 2 sheets per one job and the next job started after the machine first stopped between the job and the job. Image density and fog were examined after the printing on 30,000 sheets to evaluate running performance. An image forming apparatus used in the image reproduction test is schematically shown in FIG. 2, and its process cartridge is schematically shown in FIG. 3. In FIGS. 2 and 3, reference numeral 1 denotes a developing assembly; 2, a developer container; 3, a latent image bearing member; 4, a transfer means; 5, exposure light; 6, a developing sleeve; 7, a heat-and-pressure fixing means; 8, a cleaning blade; 9, an elastic blade (toner layer thickness control member); 11, a charging assembly; 12, a bias application means; 13, a magnetic developer; 14, a cleaning means; and 15, a magnetic-field generation means.

The image density was measured with Macbeth Densitometer (manufactured by Macbeth Co.) by measuring reflection density of a 5 mm square solid black image, using an SPI filter. The fog was measured with a reflection densitometer (REFLECTOMETER Model TC-6DS, manufactured by Tokyo Denshoku K.K.) by measuring the reflection densities of transfer mediums before and after image formation of solid white images, printed in the low-temperature and low-humidity environment. The worst value of the reflection densities after image formation was represented by Ds, and the reflection average density of transfer mediums before image formation by Dr, where the value of Ds–Dr was found to regard it as fog level to make evaluation. It shows that, the smaller the value is, the more the fog was restrained.

Further, to evaluate fixing performance, the above remodeled machine was left in an environment of 7.5° C. until its fixing assembly cooled to the temperature of the environment, from the state of which the 5 mm square solid black image was printed under cold start. As the transfer medium, bond paper (Fox River Bond Paper; basis weight: 90 g/m$^2$) was used. Using images on 1st, 3rd, 5th, 10th, 20th and 30th sheets, 5 mm square solid black images at 9 spots of the left end, the middle and the right end for each of the leading end, the middle and the rear end (9 spots/sheet ×6 sheets=54 points in total) were to and fro rubbed five times with Silbon paper under application of a load of 4.9 kPa. The point at which the rate of density decrease of the image density before and after the rubbing was highest (the worst value) was evaluated according to the following criteria to judge fixing performance. It shows that, the lower the rate of density decrease is, the superior the fixing performance is.

(Fixing Performance Evaluation Criteria)

A: The rate of density decrease is 0% or more to less than 5%.

B: The rate of density decrease is 5% or more to less than 10%.

C: The rate of density decrease is 10% or more to less than 15%.

D: The rate of density decrease is 15% or more to less than 25%.

E: The rate of density decrease is 25% or more.

Still further, in order to confirm the uniform dispersibility on toner particle surfaces of the hydrophobic inorganic fine particles added externally to Toner 1, the quantity of liberation of the hydrophobic inorganic fine particles was measured. To measure the quantity of liberated hydrophobic inorganic fine particles, about 2 g of the toner in which the hydrophobic inorganic fine particles were externally added were precisely weighed, and the weight of the hydrophobic inorganic fine particles contained in this toner was calculated (which was represented by A g). Next, this toner was taken on a mesh with an opening of 30 μm, and was sucked at the bottom of the mesh, where the quantity of hydrophobic inorganic fine particles having remained on the mesh (which was represented by B g) was measured to make calculation according to the following expression.

Quantity of hydrophobic inorganic fine particles=$B/A \times 100$ (% by weight).

Still further, in order to confirm the function of the hydrophobic inorganic fine particles as a toner running deterioration preventive agent, the fluidity of the toner in which the hydrophobic inorganic fine particles were externally added and that of the toner having remained in the toner container after 30,000-sheet printing were measured.

As an index showing the fluidity of the toner, the degree of agglomeration of the toner was measured using Powder Tester P-100 (manufactured by Hosokawa Micron Corporation). Stated specifically, on a vibrating stand, 250 μm, 150 μm and 75 μm mesh sieves were set in this order from the top, which were so set as to vibrate at a shake width of 1 mm and for a time of 20 seconds, and 5 g of the toner was gently placed on the 250 μm mesh sieve, positioned uppermost, where the sieves were vibrated. After the sieves were stopped vibrating, the weight of the toner having remained on each sieve was measured, and calculated as:

Degree of agglomeration (%)=$a+b+c$, where;

$a$=[(quantity of toner having remained on top sieve)/5 (g)]×100;

$b$=[(quantity of toner having remained on middle sieve)/5 (g)]×100×0.6; and $c$=[(quantity of toner having remained on bottom sieve)/5 (g)]×100×0.2.

It shows that, the smaller the degree of agglomeration is, the better fluidity the toner has, and that, the less the degree of agglomeration changes even after the running, the more the toner has been kept from deterioration.

The results of evaluation are shown in Table 2.

EXAMPLES 2 TO 7 & COMPARATIVE EXAMPLES 1 TO 6

Toners 2 to 13 were obtained in the same manner as in Example 1 except that the type and quantity of the hydrophobic inorganic fine particles were changed as shown in Table 2. The evaluation was made in the same manner as in Example 1. The results are shown in Table 2.

EXAMPLE 8

To 100 parts by weight of Toner Particles 2, 0.8 part by weight of Hydrophobic Inorganic Fine Particles 8 were externally added and mixed by means of a Henschel mixer to obtain Toner 14.

Using this Toner 14, and using as an image reproduction test machine a commercially available electrophotographic copying machine GP-605 (manufactured by CANON INC.), a horizontal-line pattern giving a print percentage of 1% was printed on 2,000,000 sheets in a low-temperature and low-humidity environment (L/L) of 15° C./10% RH, a normal-temperature and normal-humidity environment (N/N) of 23° C./60% RH and a high-temperature and high-humidity environment (H/H) of 35° C./80% RH. The running performance of the toner was evaluated by image density and fog in the same manner as in Example 1. Also, the performance the hydrophobic inorganic fine particles should afford to the toner was also evaluated by fixing performance, fluidity, and quantity of liberated hydrophobic inorganic fine particles in the same manner as in Example 1. The results of evaluation are shown in Table 3.

TABLE 1

| Hydrophobic Inorganic Fine Particles: | Small-particle-diameter inorganic fine particles (A) | | | | Large-particle = diameter inorganic fine particles (B) | | | (A)/(B) weight ratio | Methanol wettability (%) | Treating agent(s) (amount of (treatment) (pbw) |
|---|---|---|---|---|---|---|---|---|---|---|
| | Composition | Av. prim. particle diam. (nm) | Peak particle diam. (nm) | BET ($m^2/g$) | Composition | Av. prim. particle diam. (nm) | BET ($m^2/g$) | | | |
| 1 | Silica* | 15 | 13 | 200 | Silica* | 36 | 50 | 10:1 | 82 | HMDS (25)/DMSO (10) |
| 2 | Silica* | 8 | 6 | 300 | Silica* | 22 | 90 | 10:1 | 76 | HMDS (35)/DMSO (15) |
| 3 | Silica* | 21 | 17 | 130 | Silica* | 36 | 50 | 5:1 | 71 | HMDS (15)/DMSO (5) |
| 4 | Silica* | 15 | 13 | 200 | Silica* | 36 | 50 | 10:1 | 63 | HMDS (25) |
| 5 | Silica* | 15 | 13 | 200 | Silica* | 36 | 50 | 2:1 | 72 | DMSO (20) |
| 6 | Silica* | 7 | 6 | 380 | Titanium oxide | 52 | 20 | 1:2 | 67 | DMSO (20) |
| 7 | Titanium oxide | 23 | 19 | 90 | Titanium oxide | 122 | 10 | 7:1 | 61 | MTMS (15) |
| 8 | Silica* | 15 | 13 | 200 | Silica* | 36 | 50 | 10:1 | 71 | AMSO (15) |
| 9 | Silica* | 15 | 13 | 200 | — | — | — | — | 64 | DMSO (20) |
| 10 | — | — | — | — | Silica* | 36 | 50 | — | 62 | DMSO (5) |
| 11 | Silica* | 15 | 13 | 200 | — | — | — | — | 53 | HMDS (25) |
| 12 | — | — | — | — | Silica* | 36 | 50 | — | 57 | HMDS (6) |
| 13 | Silica* | 21 | 17 | 130 | — | — | — | — | 55 | DMDCS (10) |
| 14 | — | — | — | — | Aluminum oxide | 36 | 50 | — | 67 | DMSO (5) |
| 15 | Silica* | 7 | 6 | 380 | — | — | — | — | 60 | DMSO (20) |
| 16 | — | — | — | — | Titanium oxide | 52 | 20 | — | 71 | DMSO (20) |

*Dry-process silica;
HMDS: Hexamethyldisilazane;
DMSO: Dimethylsilicone oil;
MTMS: Methyltrimethoxysilane;
AMSO: Amino-modified silicone oil;
DMDCS: Dimethyldichlorosilane

TABLE 2

| | Toner | Hydrophobic inorganic fine particles (amount) (pbw) | Running performance | | | | | | Fixing performance | Liberated inorganic fine particles (wt. %) |
|---|---|---|---|---|---|---|---|---|---|---|
| | | | H/H image density | N/N image density | L/L image density | L/L image fog | Degree of agglomeration Before running (%) | Degree of agglomeration After running (%) | | |
| Example: | | | | | | | | | | |
| 1 | Toner 1 | HIFP 1 (1.1) | 1.48 | 1.52 | 1.50 | 0.7 | 11 | 16 | A | 1.6 |
| 2 | Toner 2 | HIFP 2 (1.1) | 1.43 | 1.48 | 1.47 | 1.7 | 9 | 26 | A | 4.4 |
| 3 | Toner 3 | HIFP 3 (1.2) | 1.39 | 1.43 | 1.40 | 2.5 | 21 | 33 | B | 8.7 |
| 4 | Toner 4 | HIFP 4 (1.1) | 1.34 | 1.37 | 1.39 | 3.1 | 6 | 41 | B | 6.9 |
| 5 | Toner 5 | HIFP 5 (1.1) | 1.31 | 1.37 | 1.38 | 3.6 | 37 | 50 | C | 10.5 |
| 6 | Toner 6 | HIFP 6 (1.2) | 1.27 | 1.33 | 1.30 | 4.1 | 38 | 61 | C | 13.3 |
| 7 | Toner 7 | HIFP 7 (1.5) | 1.21 | 1.27 | 1.29 | 5.4 | 44 | 77 | D | 17.1 |
| Comparative Example: | | | | | | | | | | |
| 1 | Toner 8 | HIFP 9 (0.5) HIFP 10 (0.5) | 1.17 | 1.20 | 1.19 | 8.5 | 48 | 81 | E | 22.3 |
| 2 | Toner 9 | HIFP 11 (0.5) HIFP 12 (0.5) | 1.11 | 1.13 | 1.13 | 5.3 | 27 | 74 | D | 18.9 |
| 3 | Toner 10 | HIFP 11 (0.5) HIFP 10 (0.5) | 1.13 | 1.15 | 1.13 | 7.6 | 34 | 79 | E | 20.8 |
| 4 | Toner 11 | HIFP 13 (0.2) HIFP 14 (0.5) | 1.02 | 1.11 | 1.10 | 6.4 | 46 | 88 | D | 15.7 |
| 5 | Toner 12 | HIFP 13 (1.0) | 1.08 | 1.14 | 1.18 | 6.9 | 40 | 92 | D | 23.3 |
| 6 | Toner 13 | HIFP 15 (0.4) HIFP 16 (0.8) | 0.92 | 1.04 | 1.12 | 8.7 | 56 | 95 | D | 30.5 |

HIFP: Hydrophobic Inorganic Fine Particles

TABLE 3

| Example: | Toner | Hydrophobic inorganic fine particles (amount) (pbw) | Running performance | | | | Degree of agglomeration | | Fixing performance | Liberated inorganic fine particles (wt. %) |
|---|---|---|---|---|---|---|---|---|---|---|
| | | | H/H image density | N/N image density | L/L image density | L/L image fog | Before running (%) | After running (%) | | |
| 8 | Toner 14 | HIFP 8 (0.8) | 1.42 | 1.46 | 1.43 | 0.7 | 34 | 39 | A | 2.2 |

HIFP: Hydrophobic Inorganic Fine Particles

What is claimed is:

1. Hydrophobic inorganic fine particles comprising a mixture obtained by mixing at least small-particle-diameter inorganic fine particles and large-particle-diameter inorganic fine particles;
    said small-particle-diameter inorganic fine particles having an average primary particle diameter of from 5 nm to 25 nm in number-based particle size distribution and having a maximum peak particle diameter of 20 nm or less in number-based particle size distribution;
    said large-particle-diameter inorganic fine particles having an average primary particle diameter in number-based particle size distribution which is from 1.5 to 100 times said average primary particle diameter of said small-particle-diameter inorganic fine particles in number-based particle size distribution; and
    said mixture being a mixture having been treated in the same treating tank to subject both said small-particle-diameter inorganic fine particles and said large-particle-diameter inorganic fine particles simultaneously to hydrophobic treatment.

2. The hydrophobic inorganic fine particles according to claim 1, wherein said mixture comprises said small-particle-diameter inorganic fine particles and said large-particle-diameter inorganic fine particles in a weight ratio (weight of small-particle-diameter inorganic fine particles:weight of large-particle-diameter inorganic fine particles) of from 1:5 to 50:1.

3. The hydrophobic inorganic fine particles according to claim 1, wherein said small-particle-diameter inorganic fine particles have a BET specific surface area of from 100 $m^2/g$ or more to 500 $m^2/g$ or less, and said large-particle-diameter inorganic fine particles have a BET specific surface area of from 5 $m^2/g$ or more to less than 100 $m^2/g$.

4. The hydrophobic inorganic fine particles according to claim 1, wherein said hydrophobic treatment is hydrophobic treatment with a silane compound.

5. The hydrophobic inorganic fine particles according to claim 1, wherein said hydrophobic treatment is hydrophobic treatment with a silicone oil.

6. The hydrophobic inorganic fine particles according to claim 1, wherein said hydrophobic treatment is hydrophobic treatment with both a silane compound and a silicone oil.

7. The hydrophobic inorganic fine particles according to claim 1, which have a methanol wettability of 60% or more.

8. The hydrophobic inorganic fine particles according to claim 1, wherein said small-particle-diameter inorganic fine particles and said large-particle-diameter inorganic fine particles have the same composition.

9. The hydrophobic inorganic fine particles according to claim 1, wherein said small-particle-diameter inorganic fine particles and said large-particle-diameter inorganic fine particles are silica particles.

10. A toner comprising toner particles and hydrophobic inorganic fine particles;
    said toner particles comprising a binder resin and a colorant; and
    said hydrophobic inorganic fine particles comprising a mixture obtained by mixing at least small-particle-diameter inorganic fine particles and large-particle-diameter inorganic fine particles;
    said small-particle-diameter inorganic fine particles having an average primary particle diameter of from 5 nm to 25 nm in number-based particle size distribution and having a maximum peak particle diameter of 20 nm or less in number-based particle size distribution;
    said large-particle-diameter inorganic fine particles having an average primary particle diameter in number-based particle size distribution which is from 1.5 to 100 times said average primary particle diameter of said small-particle-diameter inorganic fine particles in number-based particle size distribution; and
    said mixture being a mixture having been treated in the same treating tank to subject both said small-particle-diameter inorganic fine particles and said large-particle-diameter inorganic fine particles simultaneously to hydrophobic treatment.

11. The toner according to claim 10, which contains said hydrophobic inorganic fine particles in an amount of from 0.3% by weight to 5.0% by weight based on the total weight of the toner.

12. The toner according to claim 10, wherein said mixture comprises said small-particle-diameter inorganic fine particles and said large-particle-diameter inorganic fine particles in a weight ratio (weight of small-particle-diameter inorganic fine particles:weight of large-particle-diameter inorganic fine particles) of from 1:5 to 50:1.

13. The toner according to claim 10, wherein said small-particle-diameter inorganic fine particles have a BET specific surface area of from 100 $m^2/g$ or more to 500 $m^2/g$ or less, and said large-particle-diameter inorganic fine particles have a BET specific surface area of from 5 $m^2/g$ or more to less than 100 $m^2/g$.

14. The toner according to claim 10, wherein said hydrophobic treatment is hydrophobic treatment with a silane compound.

15. The toner according to claim 10, wherein said hydrophobic treatment is hydrophobic treatment with a silicone oil.

16. The toner according to claim 10, wherein said hydrophobic treatment is hydrophobic treatment with both a silane compound and a silicone oil.

17. The toner according to claim 10, which has a methanol wettability of 60% or more.

18. The toner according to claim 10, wherein said small-particle-diameter inorganic fine particles and said large-particle-diameter inorganic fine particles have the same composition.

19. The toner according to claim 10, wherein said small-particle-diameter inorganic fine particles and said large-particle-diameter inorganic fine particles are silica particles.

* * * * *